United States Patent
Shibuya et al.

(10) Patent No.: US 7,672,201 B2
(45) Date of Patent: Mar. 2, 2010

(54) DIFFRACTION GRATING, LIGHT-RECEIVING ELEMENT, AND OPTICAL HEAD AND OPTICAL RECORDING/REPRODUCING APPARATUS UTILIZING THEM

(75) Inventors: Giichi Shibuya, Tokyo (JP); Yoshinori Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 963 days.

(21) Appl. No.: 11/341,603

(22) Filed: Jan. 30, 2006

(65) Prior Publication Data

US 2006/0193053 A1     Aug. 31, 2006

(30) Foreign Application Priority Data

Feb. 2, 2005    (JP)    ............... 2005-025817

(51) Int. Cl.
    *G11B 7/00*    (2006.01)
(52) U.S. Cl. ................. 369/44.41; 369/120; 369/124.03
(58) Field of Classification Search ........................ None
    See application file for complete search history.

(56) References Cited

U.S. PATENT DOCUMENTS

| | | | |
|---|---|---|---|
| 5,085,496 A * | 2/1992 | Yoshida et al. ............... 359/569 |
| 5,231,620 A * | 7/1993 | Ohuchida ................. 369/44.14 |
| 5,258,967 A * | 11/1993 | Strasser et al. ............ 369/44.23 |
| 5,508,992 A * | 4/1996 | Hirose et al. ............ 369/112.08 |
| 5,708,636 A | 1/1998 | Takahashi et al. |
| 5,717,674 A * | 2/1998 | Mori et al. ................ 369/112.1 |
| 6,207,942 B1 | 3/2001 | Ohyama |
| 6,282,164 B1 | 8/2001 | Katayama |
| 6,567,355 B2 * | 5/2003 | Izumi et al. ............... 369/44.41 |
| 6,724,699 B2 | 4/2004 | Shibuya |
| 7,088,513 B2 * | 8/2006 | Tanaka et al. ................ 359/569 |
| 2002/0060958 A1 * | 5/2002 | Ando et al. ............... 369/44.23 |
| 2002/0114257 A1 * | 8/2002 | Sakai ..................... 369/112.12 |
| 2004/0017742 A1 * | 1/2004 | Iwata ....................... 369/44.32 |

(Continued)

FOREIGN PATENT DOCUMENTS

CN    1 538 417 A    10/2004

(Continued)

OTHER PUBLICATIONS

Machine translation of Terasaki et al., JP 2004-039109, published Feb. 5, 2004.*

*Primary Examiner*—Peter Vincent Agustin
(74) *Attorney, Agent, or Firm*—Oliff & Berridge, PLC

(57) ABSTRACT

The invention relates to a diffraction grating, a light-receiving element, and an optical head and an optical recording/reproducing apparatus utilizing them and provides a diffraction grating and a light-receiving element capable of detecting a signal of high quality and an optical head and an optical recording/reproducing apparatus utilizing them. A diffraction grating includes a diffracting region which is formed only on a light exit surface and which diffracts and separates first laser light or second laser light emitted by a two-wavelength semiconductor laser to generate a main beam and positive and negative first order sub beams. The depth of concavity formed on the diffracting region is 220 nm. The irregularities are formed such that the pitch length thereof is 22 μm and such that a convexity thereof has a width of 17.6 μm. The ratio of the width of the convexity to the pitch length of the irregularities is 0.8.

12 Claims, 12 Drawing Sheets

U.S. PATENT DOCUMENTS

| | | | |
|---|---|---|---|
| 2004/0094699 A1 | 5/2004 | Goto et al. | |
| 2004/0233533 A1* | 11/2004 | Tanaka et al. | 359/566 |
| 2005/0002313 A1 | 1/2005 | Hayashi | |
| 2005/0025028 A1* | 2/2005 | Hirai et al. | 369/112.05 |
| 2005/0122862 A1 | 6/2005 | Shin et al. | |
| 2005/0237900 A1* | 10/2005 | Sano et al. | 369/112.08 |

FOREIGN PATENT DOCUMENTS

| | | |
|---|---|---|
| JP | A-4-219654 | 8/1992 |
| JP | A-08-329490 | 12/1996 |
| JP | A 11-296873 | 10/1999 |
| JP | A-2001-256657 | 9/2001 |
| JP | A-2001-281432 | 10/2001 |
| JP | A-2001-325738 | 11/2001 |
| JP | A-2002-245660 | 8/2002 |
| JP | A-2003-059070 | 2/2003 |
| JP | A 2004-39109 | 2/2004 |
| JP | A-2004-227009 | 8/2004 |
| JP | A-2004-327005 | 11/2004 |
| JP | A 2004-335077 | 11/2004 |

* cited by examiner

FIG. 4

|  | UNIT | DVD±R/RW | DVD-RAM | CD-R/RW |
|---|---|---|---|---|
| PHYSICAL TRACK PITCH | [μm] | 0.74 | 1.23 | 1.6 |
| OPTIMUM INTERVAL BETWEEN MAIN AND SUB BEAMS | [μm] | 0.37 | 0.615 | 0.4 |
| MAIN/SUB BEAMS ADJUSTING POSITION | [μm] | 0.39 | | 0.468 |
| RATIO TO PHYSICAL TRACK PITCH |  | 0.53 | 0.32 | 0.2925 |

DIFFRACTION GRATING, LIGHT-RECEIVING ELEMENT, AND OPTICAL HEAD AND OPTICAL RECORDING/REPRODUCING APPARATUS UTILIZING THEM

BACKGROUND OF THE INVENTION

1. Field of the Invention

The present invention relates to a diffraction grating, a light-receiving element, and an optical head and an optical recording/reproducing apparatus utilizing them.

2. Description of the Related Art

An optical recording/reproducing apparatus includes an optical head for recording information in predetermined regions of a plurality of tracks formed on, for example, a disk-shaped optical recording medium so as to extend along the circumferential direction of the optical recording medium and to repeat in the radial direction of the optical recording medium or reproducing information recorded in predetermined regions of the tracks. Optical heads include recording-only types which are used only for recording information on an optical recording medium, reproduction-only types which are used only for reproducing information, and recording/reproduction types which can be used for both of recording and reproduction of information. Therefore, apparatus carrying those types of heads constitute optical recording apparatus, optical reproducing apparatus, and optical recording/reproducing apparatus, respectively. In the present specification, all of such apparatus will be generally referred to as optical recording/reproducing apparatus.

Among optical heads used in optical recording/reproducing apparatus, a type of optical heads are widely used, which carry a light source obtained by housing a plurality of light sources emitting beams of light having different wavelengths in one package to achieve a cost reduction through a reduction in the number of components. In the case of such an optical head, diffraction gratings for splitting a light beam into a plurality of beams on an information recording surface of an optical recording medium must be provided in the optical paths of the beams having different wavelengths. Thus, the optical system of the optical head must have a space to allow the diffraction gratings to be inserted. It is therefore necessary to design the optical system of the optical head with a sufficiently long optical path length, which makes it difficult to provide the optical head in a small size.

In order to solve this problem, according to the method disclosed in Patent Document 1, two types of diffraction gratings having different grating constants are made integral with each other by forming them on top and bottom surfaces of one element to provide an optical head in a small size. Patent Document 1 also discloses a method for simplifying the adjustment of the angles of the diffraction gratings by employing a design in which the two types of diffraction gratings are disposed at predetermined angles unparallel with each other.

Patent Document 1: JP-A-2004-39109

However, the diffraction gratings disclosed in Patent Document 1 must be designed such that they will transmit the entire quantity of light having a wavelength which is not used or such that they will not diffract the light. When light having an unused wavelength is diffracted, the diffracted light constitutes stray light which will impinge upon an optical recording medium. Since the stray light enters a light-receiving element after being reflected by the optical recording medium, accurate signal detection is hindered. There is a sufficient possibility for designing a diffraction grating such that substantially no stray light is generated when there are two types of light having different wavelengths. For example, let us assume that the two types of light have wavelengths of 650 nm and 780 nm. Then, the depth of grooves in the diffraction grating is in the range from about 1200 to about 1600 nm. Examples of designs in the related art indicate that it is possible to fabricate a diffraction grating in which diffracted beams having an unused wavelength can be sufficiently suppressed when an optical head is reproduction-only type and the ratio of the quantity of a 0-order beam (main beam) diffracted to the quantity of first-order beams (sub beams) diffracted is about 6:1.

When a light beam is split by an optical head which is used also for recording, if the intensity of first-order beams is too high, recording data which have already been written can be erased by the heat of the first-order beams during a recording operation. In order to avoid this, the ratio of the quantity of a 0-order beam diffracted to the quantity of first-order beams diffracted must be set at about 18:1. However, when the ratio of the quantity of the 0-order beam diffracted to the quantity of the first-order beams diffracted is set high, a problem arises in that first-order diffracted beams having an unused wavelength cannot be eliminated completely. Specifically, when a separate diffraction grating is designed for each of beams having different wavelengths, stray light from an unused diffraction grating can impinge on a light-receiving region for first-order beams among light-receiving regions formed on a light-receiving element. Even if the quantity of the stray light incident on the light-receiving region for first-order beams is very small, the quality of the detected signal will be reduced because the light-receiving region for first-order beams has relatively high sensitivity.

SUMMARY OF THE INVENTION

It is an object of the invention to provide a diffraction grating and a light-receiving element capable of detecting a signal with high quality and an optical head and an optical recording/reproducing apparatus utilizing them.

The above-described object is achieved by a diffraction grating characterized in that it includes a light entrance surface; a light exit surface; and a diffracting region which is disposed in both optical paths of a first light having a first wavelength and a second light having a second wavelength and which is formed only on either one of the light entrance surface or the light exit surface for diffracting each of the first and the second lights and separating each light into a 0-order beam and positive and negative first-order beams.

The diffraction grating according to the above-mentioned this invention is characterized in that the diffracting region includes repetitive and continuous irregularities a concavity of which is formed with a depth of 400 nm or less.

The diffraction grating according to the above-mentioned this invention is characterized in that the diffracting region includes irregularities having a rectangular section and in that the ratio of the length of a convexity to the pitch of the irregularities is in the range from 0.2 to 0.8.

The diffraction grating according to the above-mentioned this invention is characterized in that the light quantity of each of the positive and negative first-order beams generated as a result of diffraction of at least either of the first and the second light is equal to or less than one-tenth of the light quantity of the 0-order beam generated as a result of diffraction of the light.

The diffraction grating according to the above-mentioned this invention is characterized in that the first light is suitable for recording and reproduction on and from a DVD type optical recording medium, and the second light is suitable for recording and reproduction on and from a CD type optical recording medium.

The diffraction grating according to the above-mentioned this invention is characterized in that the diffracting region imparts aberration such that the diameter of a spot of each of the positive and negative first-order beams formed on an information recording surface of the DVD type optical recording medium or the CD type optical recording medium becomes greater than the diameter of a spot of the 0-order beam when viewed in the radial direction of the DVD type optical recording medium or the CD type optical recording medium.

The above-described object is achieved by a light-receiving element for receiving a 0-order beam and positive and negative first-order beams which is generated by diffracting and separating each of first light having a first wavelength and second light having a second wavelength emitted by a light source and which is converged on an optical recording medium and which is reflected on the optical recording medium, characterized in that it includes a first light-receiving region disposed based on the first wavelength and having a 0-order beam receiving area for receiving the 0-order beam generated as a result of diffraction of the first light and first-order beam receiving areas for receiving the positive and negative first-order beams generated as a result of diffraction of the first light, respectively, and a second light-receiving region disposed based on the second wavelength and having a 0-order beam receiving area for receiving the 0-order beam generated as a result of diffraction of the second light and first-order beam receiving areas for receiving the positive and negative first-order beams generated as a result of diffraction of the second light, respectively.

The light-receiving element according to the above-mentioned this invention is characterized in that the ratio of a distance L1 between the centers of the 0-order beam receiving area and each of the first-order beam receiving areas in the first light-receiving region to a distance L2 between the centers of the 0-order beam receiving area and each of the first-order beam receiving areas in the second light-receiving region is substantially equal to the ratio of the first wavelength to the second wavelength.

The light-receiving element according to the above-mentioned this invention is characterized in that the 0-order beam receiving area and the first-order beam receiving areas of the first light-receiving region have a division line extending in a direction tangential to a track of the DVD type optical recording medium.

The light-receiving element according to the above-mentioned this invention is characterized in that the 0-order beam receiving area and the first-order beam receiving areas are disposed side by side in the radial direction of the optical recording medium.

The light-receiving element according to the above-mentioned this invention is characterized in that the first and the second light-receiving regions are disposed side by side in the direction tangential to a track of the optical recording medium.

The above-described object is achieved by an optical head characterized in that it includes a light source emitting first light having a first wavelength and second light having a second wavelength, a diffraction grating having a diffracting region formed only on either light entrance surface or light exit surface for diffracting and separating the first and the second light to generate a 0-order beam and positive and negative first-order beams, and a light-receiving element including a first light-receiving region disposed based on the first wavelength and having a 0-order beam receiving area for receiving the 0-order beam generated as a result of diffraction of the first light and first-order beam receiving areas for receiving the positive and negative first-order beams generated as a result of diffraction of the first light, respectively, and a second light-receiving region disposed based on the second wavelength and having a 0-order beam receiving area for receiving the 0-order beam generated as a result of diffraction of the second light and first-order beam receiving areas for receiving the positive and negative first-order beams generated as a result of diffraction of the second light, respectively.

The optical head according to the above-mentioned this invention is characterized in that the diffraction grating is the diffraction grating according to the above-mentioned this invention.

The optical head according to the above-mentioned this invention is characterized in that the light-receiving element is the light-receiving element according to the above-mentioned this invention.

The optical head according to the above-mentioned this invention is characterized in that the light source includes a first light-emitting portion emitting the first light which is suitable for recording and reproduction on and from a DVD type optical recording medium and a second light-emitting portion emitting the second light which is suitable for recording and reproduction on and from a CD type optical recording medium.

The optical head according to the above-mentioned this invention is characterized in that spots of the positive and negative first-order beams generated as a result of diffraction of the light having the first wavelength are disposed on a DVD type optical recording medium (first optical recording medium) having a physical track pitch P1 or a DVD type optical recording medium (second optical recording medium) having a physical track pitch P2 (P2>P1) in positions which are symmetric about a spot of the 0-order beam generated as a result of diffraction of the light having the first wavelength and which are at a distance of about $P1\times(n+\frac{1}{2})$ from the spot (where n is 0 or a greater integer) in the radial direction of the first or second optical recording medium and in that spots of the positive and negative first-order beams generated as a result of diffraction of the light having the second wavelength are disposed on a CD type optical recording medium (third optical recording medium) having a physical track pitch P3 (P3>P2) in positions which are symmetric about a spot of the 0-order beam generated as a result of diffraction of the light having the second wavelength and which are at a distance of about $P3\times(n+\frac{1}{4})$ from the spot (where n is 0 or a greater integer) in the radial direction of the third optical recording medium.

The optical head according to the above-mentioned this invention is characterized in that a tracking servo signal on the DVD type optical recording medium is detected using the differential push-pull method and in that a tracking servo signal on the CD type optical recording medium is detected using the three beam method.

The invention provides an optical recording/reproducing apparatus characterized in that it includes the optical head according to the above-mentioned this invention.

The invention makes it possible to provide a diffraction grating and a light-receiving element allowing detection of a high quality signal and an optical head and an optical recording/reproducing apparatus utilizing them.

BRIEF DESCRIPTION OF THE DRAWINGS

FIG. 4 is a view associated with the optical head 10 according to the first embodiment of the invention showing positions to which the positive and negative first-order sub beams 29a, 29b, 29a', and 29b' are to be adjusted relative to the main beams 27 and 27' respectively;

DESCRIPTION OF THE PREFERRED EMBODIMENTS

First Embodiment

Figure 1:
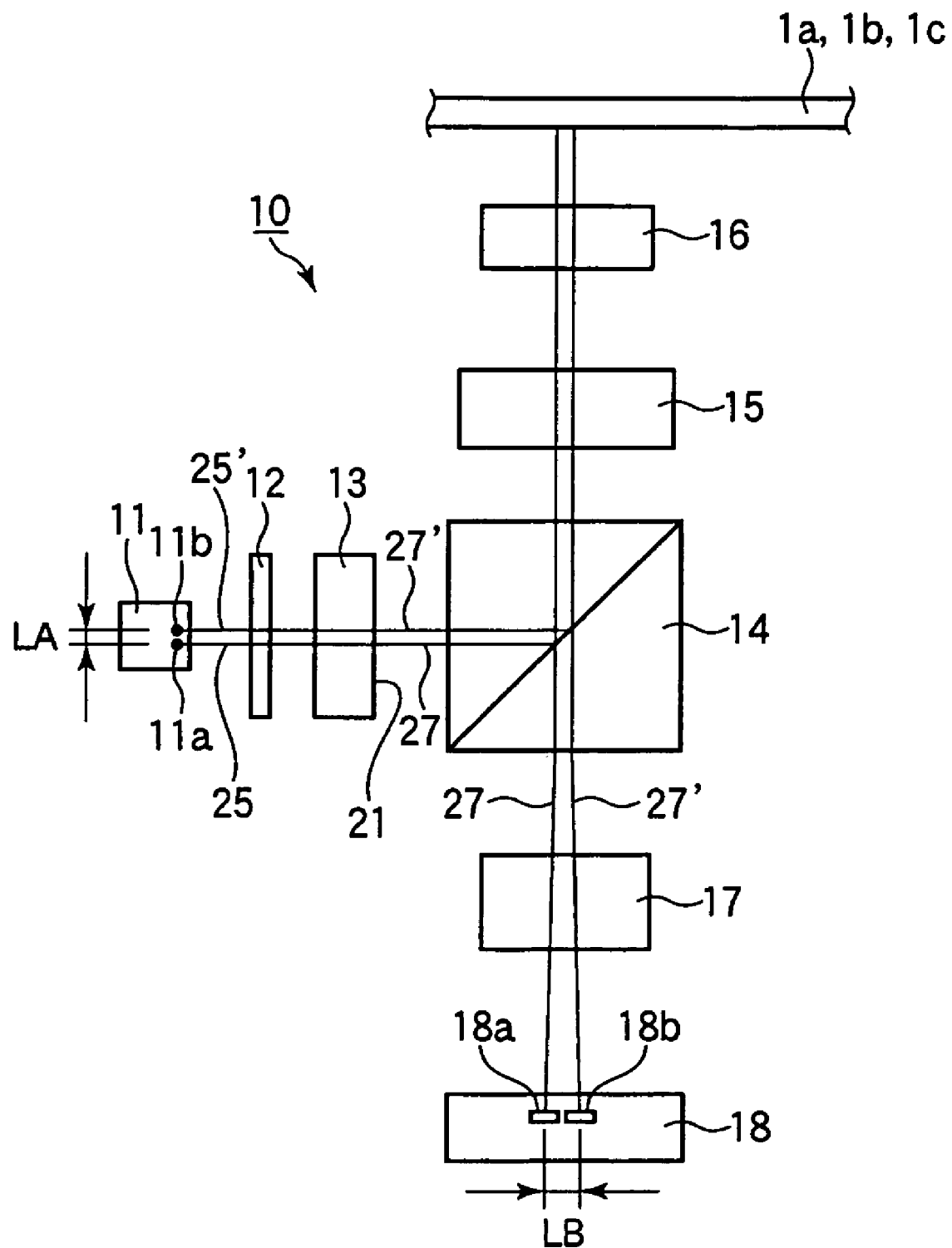
FIG. 1 shows a schematic configuration of an optical head according to a first embodiment of the invention.

A description will now be made with reference to FIGS. 1 to 11 on a diffraction grating, a light-receiving element, and an optical head and an optical recording/reproducing apparatus utilizing them according to a first embodiment of the invention. In the present specification, a general term "diffracting grating" implies both of a diffracting element in the form of a straight grating and a diffracting element in the form of a curved grating. FIG. 1 shows a schematic configuration of an optical head 10 of the present embodiment. For example, the optical head 10 can be used for a first optical recording medium 1a, a second optical recording medium 1b (a DVD type optical recording medium), and a third optical recording medium 1c (a CD type optical recording medium). The optical head 10 includes a two-wavelength semiconductor laser (light source) 11, a phase difference plate 12, a phase modulation type diffraction grating 13, a beam splitter 14, a collimator lens 15, a rising mirror and a power-monitoring photo-diode which are not shown, an objective lens 16, a sensor lens 17, and a light-receiving element 18.

For example, the two-wavelength semiconductor laser 11 is configured by incorporating a first light-emitting portion 11a emitting first laser light (first light) 25 having a first wavelength and a second light-emitting portion 11b emitting second laser light (second light) 25' having a second wavelength (first wavelength<second wavelength) in a single package. The first laser light 25 having the first wavelength is light having a wavelength of 650 nm which is suitable for recording and reproduction on and from, for example, a DVD type optical recording medium. The second laser light 25' having the second wavelength is light having a wavelength of 780 nm which is suitable for recording and reproduction on and from, for example, a CD type optical recording medium. The optical output of the first laser light 25 or second laser light 25' emitted by the two-wavelength semiconductor laser 11 is detected by the power-monitoring photodiode which is not shown, and feedback control is performed on electric power supplied to the first light-emitting portion 11a or second light-emitting portion 11b to control the optical output of the two-wavelength semiconductor laser 11 automatically.

The phase difference plate 12 is constituted by, for example, a quarter wave plate. The first and the second laser beams 25 and 25' are converted by the phase difference plate 12 from linearly polarized light into circular polarized light. For example, the phase difference plate 12 in the present embodiment is configured by applying a functional film on a thin glass plate. The phase difference plate 12 is disposed such that its optical axis is at an angle of 45° to the plane of polarization of linearly polarized light.

The diffraction grating 13 is disposed in the optical paths of the first and the second laser light 25 and 25' such that it will sufficiently contain the first and the second laser light 25 and 25'. The diffraction grating 13 includes a diffracting region 21 which is formed only on a light exit surface thereof for diffracting each of the first and the second laser light 25 and 25' and separating the light in a predetermined light quantity ratio to generate a 0-order beam (main beam 27 or 27') and positive and negative first-order beams (positive and negative first-order sub beams) which are not shown. The diffracting region 21 may alternatively be formed only on a light entrance surface of the diffraction grating 13. The diffraction grating 13 separates the beams such that each of the positive and negative first-order sub beams obtained by diffracting at least either the first laser light 25 or the second laser light 25' will have a quantity that is one-tenth or less of the quantity of the main beam. For example, the diffraction grating 13 diffracts and separates the first laser light 25 or the second laser light 25' such that the ratio of the quantity of the main beam 27 to the quantities of its positive and negative first-order sub beams will be 18 (main beam 27): 1 (positive first-order sub beam): 1 (negative first-order sub beam) and such that the ratio of the quantity of the main beam 27' to the quantities of its positive and negative first-order sub beams will be 28 (main beam 27'): 1 (positive first-order sub beam): 1 (negative first-order sub beam).

The beam splitter 14 has the function of a so-called half-mirror in that it reflects the first laser light 25 or the second laser light 25' from the two-wavelength semiconductor laser 11 toward the first, the second, or the third optical recording medium 1a, 1b, or 1c and transmits reflected light from the first, the second, or the third optical recording medium 1a, 1b, or 1c toward the light-receiving element 18. FIG. 1 shows a cubic beam splitter 14 by way of example.

The collimator lens 15 is provided to convert a divergent bundle of rays from the two-wavelength semiconductor laser 11 into a parallel bundle of rays which is then guided to the objective lens 16 and to convert a parallel bundle of rays from the objective lens 16 into a convergent pencil of rays which is then guided to the light-receiving element 18.

The objective lens 16 is provided to form a reading spot by converging the parallel bundle of rays from the collimator lens 15 on an information recording surface of the first, the second, or the third optical recording medium 1a, 1b, or 1c and to convert reflected light from the first, the second, or the third optical recording medium 1a, 1b, or 1c into a parallel bundle of rays which is then guided to the collimator lens 15.

The objective lens 16 is held on an actuator assembly which is not shown such that it can be moved in a focusing direction (focus direction) and a tracking direction (the radial direction of the optical recording medium). The position of the objective lens 16 is controlled using focus servo control and tracking servo control to allow a spot formed by the main beam to follow up a reading point on the first, the second, or the third optical recording medium 1a, 1b, or 1c.

The rising mirror, which is omitted in the illustration, reflects the parallel bundle of rays from the collimator lens 15 toward the objective lens 16 and reflects the parallel bundle of rays from the objective lens 16 toward the collimator lens 15.

The sensor lens 17 and the light-receiving element 18 are disposed on a light transmitting side of the beam splitter 14 when viewed from the collimator lens 15, the elements 17 and 18 being listed in the order of their closeness to the beam splitter 14. The sensor lens 17 serves as a reflected light focus position adjusting portion for optically adjusting the focus positions of the main beam and the positive and negative first-order sub beams reflected by the first, the second, or the third optical recording medium 1a, 1b, or 1c. The sensor lens 17 forms an image of each of the main beam and the positive and negative first-order sub beams reflected by the first, the second, or the third optical recording medium 1a, 1b, or 1c on the light-receiving element 18 separately, the image being enlarged at a predetermined optical magnification.

The light-receiving element 18 includes a first light-receiving region 18a for receiving each of a main beam 27 and positive and negative first-order sub beams originating from a reflection of the first laser light 25 on the first or the second optical recording medium 1a or 1b and a second light-receiving region 18b for receiving each of a main beam 27' and the positive and negative first-order sub beams originating from a reflection of the second laser light 25' on the third optical recording medium 1c. The first and the second light-receiving regions 18a and 18b are disposed side by side and kept away from each other at an interval LB in a direction tangential to a track of the first, the second, or the third optical recording medium 1a, 1b, or 1c based on an interval LA between the first and the second light-emitting portions 11a and 11b.

The light intensity of the main beam 27 and the positive and negative first-order sub beams received by the first light-receiving region 18a is converted into an electrical signal. A predetermined calculation is performed using the electrical signal to detect a tracking servo signal to be used for causing the objective lens 16 to follow up the first or the second optical recording medium 1a or 1b. The light intensity of the main beam 27' and the positive and negative first-order sub beams received by the second light-receiving region 18b is converted into an electrical signal. A predetermined calculation is performed using the electrical signal to detect a tracking servo signal to be used for causing the objective lens 16 to follow up the third optical recording medium 1c.

Figure 2A:
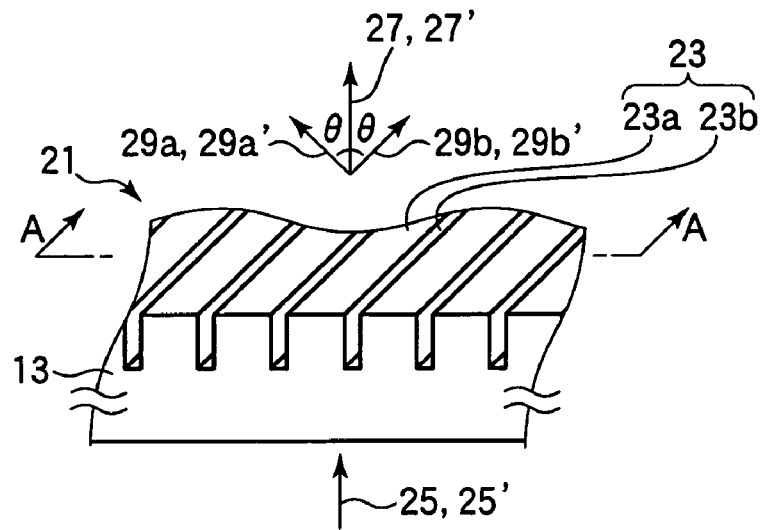
FIGS. 2A and 2B show a schematic configuration of a diffraction grating 13 according to the first embodiment of the invention.
Figure 2B:
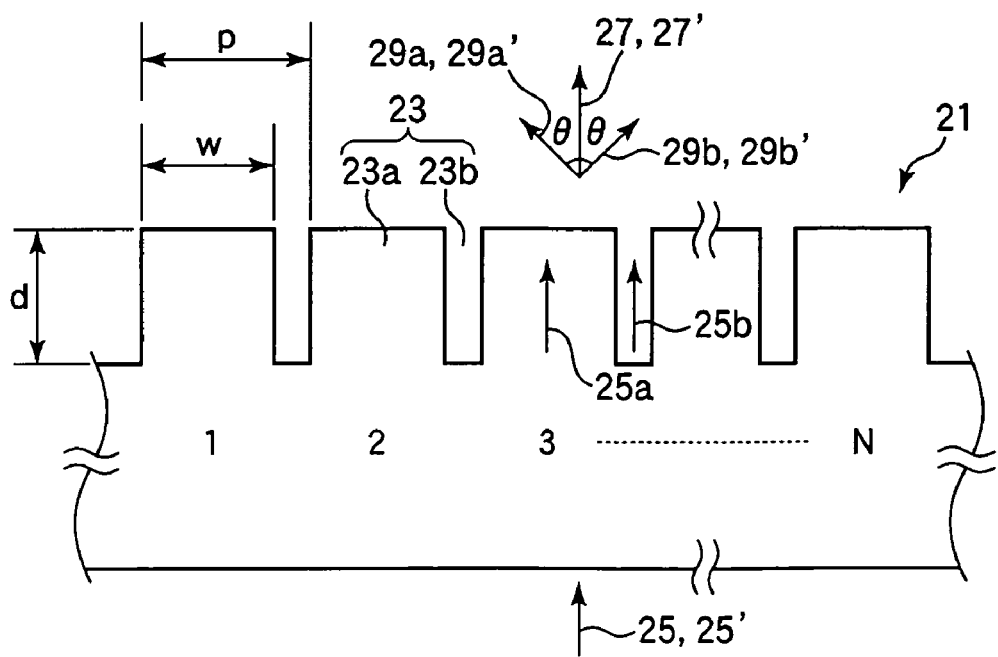

FIGS. 2A and 2B show a schematic configuration of the diffraction grating 13. FIG. 2A is a partial perspective view of the diffraction grating 13. FIG. 2B is a sectional view taken along the imaginary line A-A shown in FIG. 2A. As shown in FIGS. 2A and 2B, the diffraction grating 13 has a diffracting region 21 which is formed only on a light exit surface of the same for diffracting and separating the first laser light 25 or the second laser light 25' emitted by the two-wavelength semiconductor laser 11 (not shown in FIGS. 2A and 2B) to generate a main beam 27 and positive and negative first-order sub beams 29a and 29b or a main beam 27' and positive and negative first-order sub beams 29a' and 29b'. The main beam 27 or 27' is a 0-order beam which is constituted by the first laser light 25 or the second laser light 25' that is transmitted with being subjected to substantially no diffraction at the diffracting region 21. The positive and negative first-order sub beams 29a, 29b, 29a', and 29b' are positive and negative first-order beams which are diffracted at the diffracting region 21 to exit the grating at predetermined angles θ to the main beams 27 and 27'. The predetermined angles θ depend on the wavelength of the first and the second laser light 25 and 25' entering the diffraction grating 13. For example, let us assume that the first wavelength of the first laser light 25 is represented by λ1; the second wavelength of the second laser light 25' is represented by λ2 (λ1>λ2); the angle of the first laser light 25 is represented by θ1; and the angle of the second laser light 25' is represented by θ2. Then, the angle θ2 is greater than the angle θ1.

The diffracting region 21 has N repetitive and continuous irregularities 23. As shown in FIG. 2B, a concavity 23b of the irregularities 23 is formed to have a depth d of 400 nm or less and is formed, for example, with a depth of 220 nm. The irregularities 23 are formed to have a rectangular section. For example, the irregularities 23 are formed to have a pitch length p of 22 μm. For example, a convexity 23a is formed to have a width w of 17.6 μm. The ratio of the width w of a convexity 23a to the pitch length p of the irregularities 23 is kept in the range from 0.2 to 0.8.

The diffraction grating 13 is formed of a glass material having a refractive index of, for example, 1.52. The refractive index of the convexities 23a is different from the refractive index of the concavities 23b which are filled with air. The phase of a laser beam 25a among the laser light 25 incident on the diffraction grating 13 which has exited the diffracting region after being transmitted by a convexity 23a is different from the phase of a laser beam 25b which has exited after being transmitted by a concavity 23b. As a result, the laser beams 25a and 25b which have exited the diffracting region 21 interfere and diffract each other to generate a main beam 27 (0-order beam) and positive and negative first-order sub beams 29a and 29b (positive and negative first-order beams).

When the ratio of the width w of a convexity 23a to the pitch length p of the irregularities 23 (the duty ratio of the irregularities 23) is changed, the quantities of the laser beams 25a and 25b transmitted by the diffracting region 21 change. Therefore, the ratio of the quantity of the main beam 27 exiting diffracting region 21 (0-order beam) to the quantities of the positive and negative first-order sub beams 29a and 29b (positive and negative first-order beams) can be set at a predetermined value by changing the duty ratio of the irregularities 23.

By setting the depth d of the concavities 23b and the duty ratio of the irregularities 23 appropriately as thus described, it is possible to generate a main beam 27, positive and negative first-order sub beams 29a and 29b diffracted at a predetermined angle θ1 or a main beam 27', positive and negative first-order sub beams 29a' and 29b' diffracted at a predetermined angle θ2. It is also possible to set the ratio of the quantity of the main beam 27 to the quantities of the positive and negative first-order sub beams 29a and 29b or the ratio of the quantity of the main beam 27' to the quantities of the positive and negative first-order sub beams 29a' and 29b' at a predetermined value.

Figure 3C:
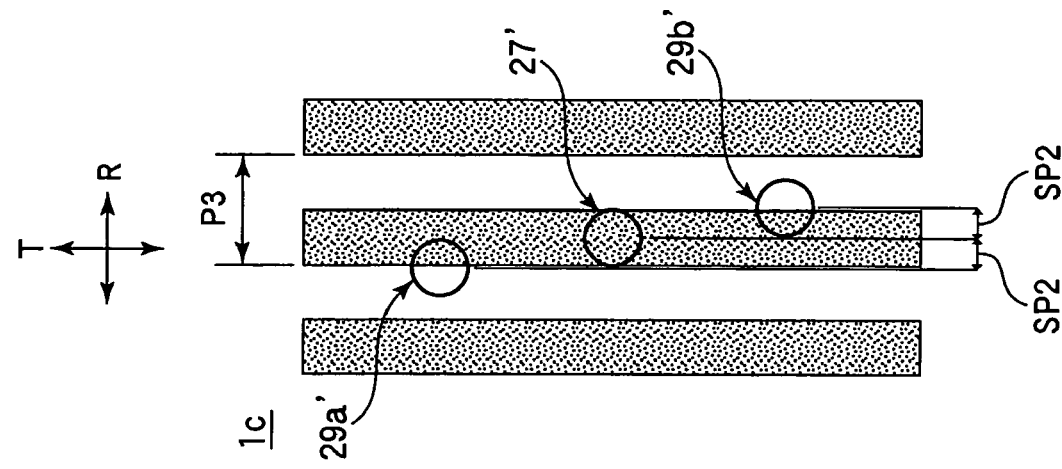
FIGS. 3A to 3C schematically show main beams 27 and 27' and positive and negative first-order sub beams 29a, 29b, 29a', and 29b' converged on information recording surfaces of first to third optical recording media 1a, 1b, and 1c by the optical head 10 according to the first embodiment of the invention.
Figure 3B:
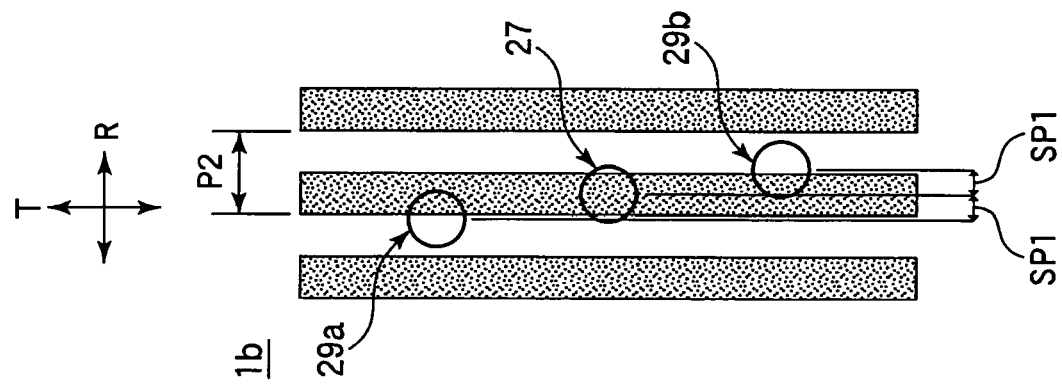
Figure 3A:
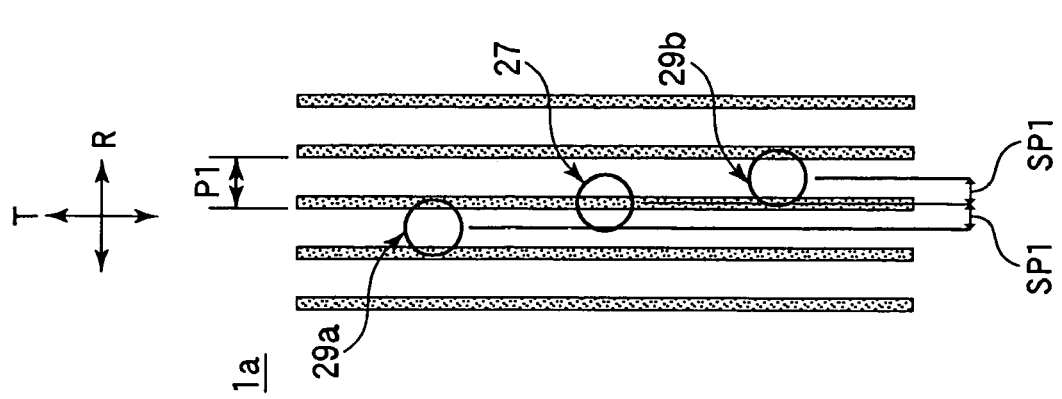

FIGS. 3A to 3C schematically show states of main beams 27 and positive and negative first-order sub beams 29a and 29b converged on the information recording surfaces of the first and the second optical recording media 1a and 1b and a state of a main beam 27' and positive and negative first-order sub beams 29a' and 29b' converged on the information recording surface of the third optical recording medium 1c. FIG. 3A shows an information recording surface of a DVD-RW as the first optical recording medium 1a. FIG. 3B shows an information recording surface of a DVD-RAM as the second optical recording medium 1b. FIG. 3C shows an information recording surface of a CD-R as the third optical recording medium 1c. The arrows in the horizontal direction in FIGS. 3A to 3C represent the radial direction R of the first to the third optical recording media 1a, 1b, and 1c, and the arrows in the vertical direction represent a direction T tangential to tracks of the first to the third optical recording media 1a, 1b, and 1c.

As shown in FIGS. 3A and 3B, the intervals (represented by SP1) between spots formed by the main beam 27 and the positive and negative first-order sub beams 29a and 29b in the radial direction R are adjusted to 0.39 μm on either of the first and the second optical recording media 1a and 1b. That is, the spot of the positive first-order sub beam 29a is located at a distance of +0.39 μm in the radial direction R from the spot of the main beam 27 (to the left of the same in the figures). The spot of the negative first-order sub beam 29b is located at a distance of −0.39 μm in the radial direction R from the spot of the main beam 27 (to the right of the same in the figures).

Since the first optical recording medium 1a has a physical track pitch P1 of 0.74 μm, ±P1×(n+½)=±0.74×(0+½)=±0.37 μm (n=0). Thus, the positive and negative first-order sub beams 29a and 29b are adjusted such that they are offset from the spot of the main beam 27 in the radial direction by an amount which is about one half of the physical track pitch P1 of the first optical recording medium 1a.

Since the laser beam 27' emitted by the second light-emitting portion 11b has a wavelength longer than the wavelength of the laser beam 27 emitted by the first light-emitting portion 11a, it is diffracted at a greater angle by the diffraction grating 13. As a result, when the spot intervals SP1 between the main beam 27 and the positive and negative first-order sub beams 29a and 29b is adjusted to 0.39 μm, the intervals (represented by SP2) between spots formed by the main beam 27' and the positive and negative first-order sub beams 29a' and 29b' are determined based on the ratio of the wavelengths of the laser beams 27 and 27'. As shown in FIG. 3C, the spot intervals SP2 between the main beam 27' and the positive and negative first-order sub beams 29a' and 29b' in the radial direction of the third optical recording medium 1c is 0.468 μm (=0.39 μm×780 nm/650 nm).

Since the third optical recording medium 1c has a physical track pitch P3 of 1.6 μm, ±P3×(n+¼)=±1.6×(0+¼)=±0.4 μm (n=0). Thus, the positive and negative first-order sub beams 29a' and 29b' are adjusted such that they are offset from the spot of the main beam 27' in the radial direction by an amount which is approximately equal to a quarter of the physical track pitch P3 of the third optical recording medium 1c.

FIG. 4 shows a list of positions to which the positive and negative first-order sub beams 29a, 29b, 29a', and 29b' are to be adjusted relative to the main beams 27 and 27' as shown in FIGS. 3A to 3C. Referring to FIG. 4, optimum values of the spot interval between a main beam and sub beams are shown in the column named "optimum interval between main and sub beams", and spot intervals SP1 and SP2 are shown in the column named "main beam/sub beam adjusting positions". The ratios of each of the spot intervals SP1 and SP2 to the physical track pitches P1, P2, and P3 are shown in the column named "ratio to physical track pitch".

As described above, the intervals between spots of a main beam and sub beams in the radial direction of an optical recording medium are set such that they are 0.39 μm when the medium is the first optical recording medium 1a (DVD±R/RW). The spot interval SP1 has a value that is relatively close to an optimum value of 0.37 μm of intervals between spots of a main beam and sub beams according to the differential push-pull method. As shown in FIG. 4, the ratio of the spot interval to the physical track pitch of the first optical recording medium 1a (DVD±R/RW) is 0.53 which is substantially equal to an optimum value of 0.50. Therefore, the differential push-pull method can be used for generating a track servo signal for the first optical recording medium 1a (DVD±R/RW).

The spot interval SP1=0.39 μm is different from an optimum value of 0.615 μm for the second optical recording medium 1b (DVD-RAM). However, in the case of an optical recording medium employing the land-groove recording method like the second optical recording medium 1b (DVD-RAM), a track cross signal generated when the objective lens moves across the optical recording medium has high contrast (amplitude) in comparison to optical recording media employing other methods of recording. For this reason, a track cross signal having relatively great amplitude can be obtained on the second optical recording medium 1b (DVD-RAM) even though the spot interval SP1 is far away from the optimum value. Therefore, the differential push-pull method can be used for generating a track servo signal also on the second optical recording medium 1b (DVD-RAM).

The spot interval SP2 between the main beam 27' and the positive and negative first-order sub beams 29a' and 29b' converged on the information recording surface of the third optical recording medium 1c (CD-R/RW) is 0.468 μm. The spot interval SP2 has a value that is relatively close to an optimum value of 0.4 μm of intervals between spots of a main beam and sub beams according to the three beam method. It is therefore possible to use the three beam method for the generation of a track servo signal on the third optical recording medium 1c (CD-R/RW).

Figure 5:
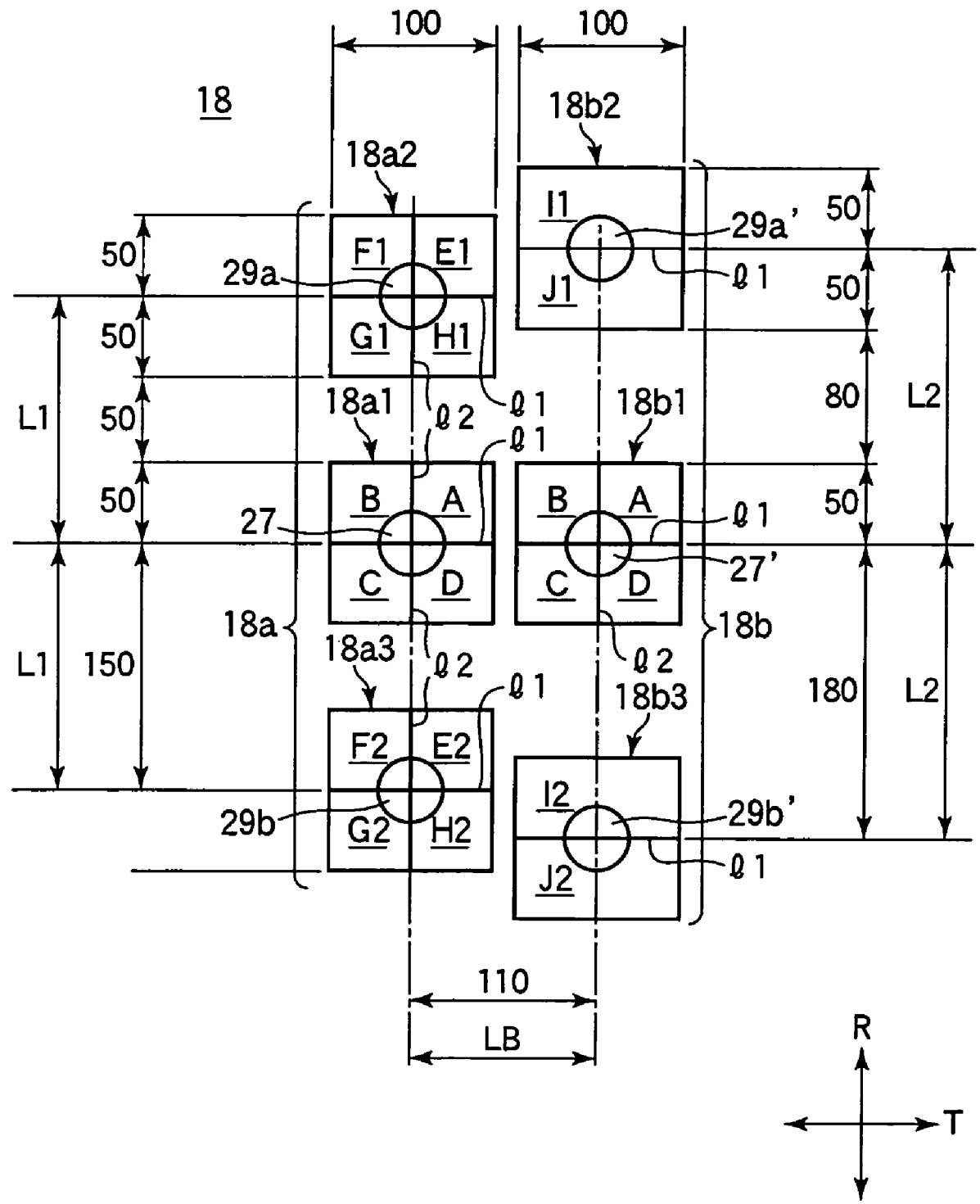
FIG. 5 is a view of a light-receiving element 18 according to the first embodiment of the invention taken from a light entrance surface thereof.

FIG. 5 shows a state of a light-receiving surface of the light-receiving element 18 of the present embodiment in a view from the side of the light entrance surface thereof. A direction T tangential to a track of an optical recording medium is indicated by arrows in the horizontal direction in FIG. 5, and the radial direction R of the optical recording medium is represented by arrows in the vertical direction. As shown in FIG. 5, the light-receiving element 18 includes a first light-receiving region 18a which is disposed based on the wavelength of the first laser light 25 and which receives the main beam 27 and the positive and negative first-order sub beams 29a and 29b reflected by the first or the second optical recording medium 1a or 1b (not shown in FIG. 5) and a second light-receiving region 18b which is disposed based on the wavelength of the second laser light 25' and which receives the main beam 27' and the positive and negative first-order sub beams 29a' and 29b' reflected by the third optical recording media 1c (not shown in FIG. 5).

The first light-receiving region 18a includes a main beam receiving area (0-order beam receiving area) 18a1 for receiving the main beam 27 and sub beam receiving areas (first-order beam receiving areas) 18a2 and 18a3 for receiving the positive and negative first-order sub beams 29a and 29b, respectively. Similarly, the second light-receiving region 18b includes a main beam receiving area (0-order beam receiving area) 18b1 for receiving the main beam 27' and sub beam receiving areas (first-order beam receiving areas) 18b2 and 18b3 for receiving the positive and negative first-order sub beams 29a' and 29b', respectively.

For example, the main beam receiving area 18a1 has a square shape formed with a length of about 100 μm per side. The main beam receiving area 18a1 has a division line 11 extending in the direction T tangential to a track of the first or the second recording medium 1a or 1b and a division line 12 extending in the radial direction R substantially orthogonally to the division line 11. The main beam receiving area 18a1 is divided by the division lines 11 and 12 to have four square light-receiving portions A, B, C, and D arranged adjacent to each other in the form of a matrix. Each of the light-receiving portions A, B, C, and D is formed with a length of about 50 μm per side. The light-receiving portion A is disposed such that it adjoins the light-receiving portion D across the division line 11 and adjoins the light-receiving portion B across the division line 12 and such that it is positioned diagonally to the light-receiving portion C. The light-receiving portion C is disposed to adjoin the light-receiving portion B across the division line 11 and adjoin the light-receiving portion D across the division line 12. The light-receiving portions A, B, C, and D are electrically isolated from each other by the division lines 11 and 12.

For example, the sub beam receiving area 18a2 for receiving the positive first-order sub beam 29a has a square shape formed with a length of about 100 μm per side. The sub beam receiving area 18a2 has a division line 11 extending in the direction T tangential to a track of the first or the second recording medium 1a or 1b and a division line 12 extending in the radial direction R substantially orthogonally to the division line 11. The sub beam receiving area 18a2 is divided by the division lines 11 and 12 to have four square light-receiving portions E1, F1, G1, and H1 arranged adjacent to each other in the form of a matrix. Each of the light-receiving portions E1, F1, G1, and H1 is formed with a length of about 50 μm per side. The light-receiving portion E1 is disposed such that it adjoins the light-receiving portion H1 across the division line 11 and adjoins the light-receiving portion F1 across the division line 12 and such that it is positioned diagonally to the light-receiving portion G1. The light-receiving portion G1 is disposed to adjoin the light-receiving portion F1 across the division line 11 and adjoin the light-receiving portion H1 across the division line 12. The light-receiving portions E1, F1, G1, and H1 are electrically isolated from each other by the division lines 11 and 12.

Similarly, the sub beam receiving area 18a3 for receiving the negative first-order sub beam 29b has a square shape formed with, for example, a length of about 100 μm per side. The sub beam receiving area 18a3 has a division line 11 extending in the direction T tangential to a track of the first or the second recording medium 1a or 1b and a division line 12 extending in the radial direction R substantially orthogonally to the division line 11. The sub beam receiving area 18a3 is divided by the division lines 11 and 12 to have four square light-receiving portions E2, F2, G2, and H2 arranged adjacent to each other in the form of a matrix. Each of the light-receiving portions E2, F2, G2, and H2 is formed with a length of about 50 μm per side. The light-receiving portion E2 is disposed such that it adjoins the light-receiving portion H2 across the division line 11 and adjoins the light-receiving portion F2 across the division line 12 and such that it is positioned diagonally to the light-receiving portion G2. The light-receiving portion G2 is disposed to adjoin the light-receiving portion F2 across the division line 11 and adjoin the light-receiving portion H2 across the division line 12. The light-receiving portions E2, F2, G2, and H2 are electrically isolated from each other by the division lines 11 and 12.

The sub beam receiving areas 18a2 and 18a3 are arranged side by side in the radial direction R of the first or the second optical recording medium 1a or 1b such that they sandwich the main beam receiving area 18a1. The main beam receiving area 18a1 and the sub beam receiving areas 18a2 and 18a3 are disposed at intervals of about 50 μm each in the radial direction R of the first or the second optical recording medium 1a or 1b. A distance L1 between the center of the main beam receiving area 18a1 and the center of each of the sub beam receiving areas 18a2 and 18a3 are about 150 μm.

The main beam receiving area 18b1 of the second light-receiving region 18b will not be described because it is formed with a configuration and shape similar to those of the main beam receiving area 18a1 of the first light-receiving region 18a. For example, the sub beam receiving area 18b2 of the second light-receiving region 18b has a square shape formed with a length of about 100 μm per side. The sub beam receiving area 18b2 has a division line 11 extending in the direction T tangential to a track. The sub beam receiving area 18b2 is divided by the division line 11 to have rectangular light-receiving portions I1 and J1 arranged adjacent to each other. The light-receiving portions I1 and J1 are formed in a rectangular shape which is about 100 μm long in the direction T tangential to a track of the third optical recording medium 1c and about 50 μm long in the radial direction R of the medium. The light-receiving portions I1 and J1 are electrically isolated from each other by the division line 11.

Similarly, the sub beam receiving area 18b3 has a square shape formed with, for example, a length of about 100 μm per side. The sub beam receiving area 18b3 has a division line 11 extending in the direction T tangential to a track of the third optical recording medium 1c. The sub beam receiving area 18b3 is divided by the division line 11 to have rectangular light-receiving portions I2 and J2 arranged adjacent to each other. The light-receiving portions I2 and J2 are formed in a rectangular shape which is about 100 μm long in the direction T tangential to a track of the third optical recording medium 1c and about 50 μm long in the radial direction R of the medium. The light-receiving portions I2 and J2 are electrically isolated from each other by the division line 11.

The sub beam receiving areas 18b2 and 18b3 are arranged side by side in the radial direction R of the third optical recording medium 1c such that they sandwich the main beam receiving area 18b1. The ratio of the distance L1 between the centers of the main beam receiving area 18a1 of the first light-receiving region 18a and each of the sub beam receiving areas 18a2 and 18a3 to the distance (represented by L2)

between the centers of the main beam receiving area 18b1 of the second light-receiving region 18b and each of the sub beam receiving areas 18b2 and 18b3 is substantially equal to the ratio of the wavelength of the first laser light 25 to the wavelength of the second laser light 25'. Therefore, the distance L2 between the center of the main beam receiving area 18b1 and the center of each of the sub beam receiving areas 18b2 and 18b3 is 180 μm (=(780 nm/650 nm)×150 nm) which is determined based on a relationship expressed by L2=(λ2/λ1)×L1 where λ1 and λ2 represent the wavelengths of the first and the second laser light 25 and 25', respectively.

The first and the second light-receiving regions 18a and 18b are disposed side by side such that the division lines 11 in the respective main beam receiving areas 18a1 and 18b1 are substantially aligned on a straight line in the direction T tangential to tracks of the first to the third optical recording media 1a, 1b, and 1c. The interval (represented by LB) between the center of the main beam receiving area 18a1 and the center of the main beam receiving area 18b1 is determined based on the interval LA between the first and the second light emitting portions 11a and 11b (not shown in FIG. 5). For example, the main beam receiving areas 18a1 and 18b1 are disposed such that LB=110 μm.

Figure 6A:
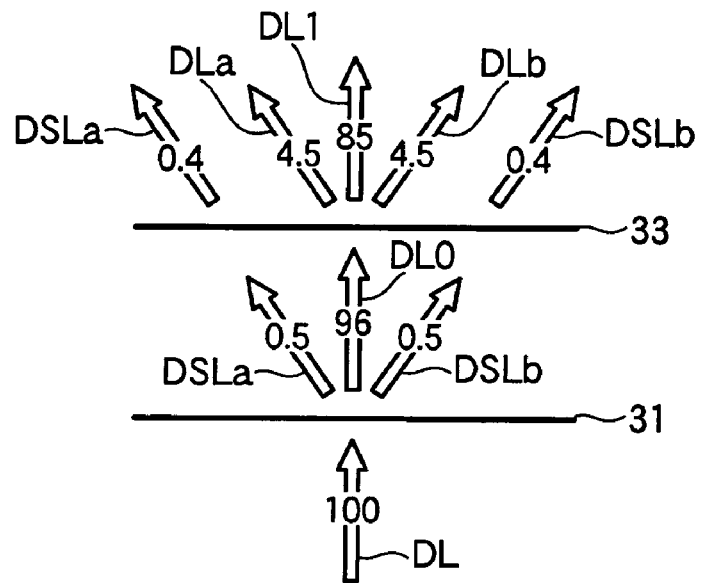
FIGS. 6A and 6B are illustrations for explaining the diffraction grating 13 according to the first embodiment of the invention, schematically showing the ratio of quantities of a main beam, sub beams and stray lights at diffraction gratings having two different grating constants according to the related art.
Figure 6B:
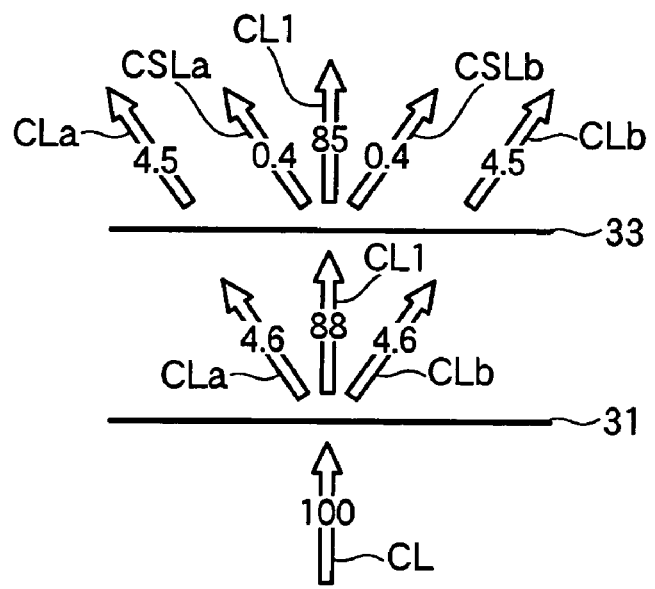

A method of designing the diffraction grating 13 will now be described with reference to FIGS. 6A to 10. FIGS. 6A and 6B schematically show ratios of light quantities of main beams, sub beams and stray light in diffraction gratings having two different grating constants according to the related art. FIG. 6A shows a ratio of quantities of light in a case in which laser light DL from a light source on a DVD side is transmitted. FIG. 6B show a ratio of quantities of light in a case in which laser light CL from a light source on a CD side is transmitted. The numerical values shown in FIGS. 6A and 6B represent the quantities (%) of transmitted beams where the quantities of the incident laser light DL and CL are 100%.

As shown in FIG. 6A, the laser light DL emitted by the light source on the DVD side is transmitted by a diffraction grating 31 for CDs and then by a diffraction grating 33 for DVDs. The diffraction grating 31 for CDs is designed to transmit the laser light DL without diffracting the same. The diffraction grating 33 for DVDs diffracts and separates the laser light DL such that the ratio of the light quantity of a main beam DL1 to the light quantity of each of positive and negative first-order sub beams DLa and DLb becomes 18:1. In practice, however, since the laser light DL is slightly diffracted by the diffraction grating 31 for CDs, a 0-order beam and positive and negative first-order beams are generated. The positive and negative first-order beams constitute stray light DSLa and DSLb. The light quantity of the 0-order beam (represented by DL0) is equivalent to about 96% of the light quantity of the laser light DL, and the light quantity of each of the stray light DSLa and DSLb is equivalent to about 0.5% of the light quantity of the laser light DL. The remaining light quantity of about 3% of the laser light DL constitutes positive and negative second-order beams and positive and negative third-order beams, and the like and the quantity of light may alternatively be absorbed by the diffraction grating 31 for CDs.

The 0-order beam DL0 is diffracted by the diffraction grating 33 for DVDs, and the 0-order beam DL0 is separated into a main beam DL1 and positive and negative first-order sub beams DLa and DLb. The light quantity of the main beam DL1 is equivalent to about 85% of the light quantity of the laser light DL, and the light quantity of each of the positive and negative first-order sub beams DLa and DLb is equivalent to about 4.5% of the light quantity of the laser light DL. The ratio of the light quantity of the main beam DL1 to the light quantity of the positive and negative first-order sub beams DLa and DLb is substantially 18:1. The beams of stray light DSLa and DSLb are also diffracted by the diffraction grating 33 for DVDs, and the beams of stray light DSLa and DSLb are separated into a main beam and positive and negative first-order sub beams. The positive and negative first-order sub beams are not shown in FIG. 6A because their quantities are very small. The beams of stray light DSLa and DSLb transmitted by the diffraction grating 33 for DVDs have a light quantity that is equivalent to about 0.4% of the light quantity of the laser light DL. The light quantity of the stray light DSLa and DSLb is equivalent to about 10% of the light quantity of the positive and negative first-order sub beams DLa and DLb. Thus, the light quantity of the stray light DSLa and DSLb is large relative to the light quantity of the positive and negative first-order sub beams DLa and DLb. Therefore, when the stray light DSLa and DSLb enter a highly sensitive light-receiving region for the positive and negative first-order sub beams DLa and DLb, the quality of the resultant reproduction signal is degraded.

As shown in FIG. 6B, the laser light CL emitted by the light source on the CD side is diffracted by the diffraction grating 31 for CDs to be separated into a main beam CL1 and positive and negative first-order sub beams CLa and CLb. The light quantity of the main beam CL1 is equivalent to about 88% of the light quantity of the laser light CL, and the light quantity of each of the positive and negative first-order sub beams CLa and CLb is equivalent to about 4.6% of the light quantity of the laser light CL. A design is employed, in which the main beam CL1 and the positive and negative first-order sub beams CLa and CLb should not be diffracted by the diffraction grating 33 for DVDs. In practice, however, the main beam CL1 and the positive and negative first-order sub beams CLa and CLb are diffracted by the diffraction grating 33 for DVDs. The main beam CL1 is diffracted by the diffraction grating 33 for DVDs, and a 0-order beam (main beam CL1) and positive and negative first-order beams generate. The positive and negative first-order beams constitute stray light CSL1 and CSL2. The light quantity of the main beam CL1 transmitted by the diffraction grating 33 for DVDs is equivalent to about 85% of the light quantity of the laser light CL, and the light quantity of each of the stray light CSL1 and CSL2 is equivalent to about 0.4% of the light quantity of the laser light CL.

The positive and negative first-order sub beams CLa and CLb are also diffracted by the diffraction grating 33 for DVDS, and the positive and negative first-order sub beams CLa and CLb are separated into a main beam and positive and negative first-order sub beams. The positive and negative first-order sub beams are not shown in FIG. 6B because their quantities are very small. The positive and negative first-order sub beams CLa and CLb transmitted by the diffraction grating 33 for DVDs have a light quantity that is equivalent to about 4.5% of the light quantity of the laser light CL. The ratio of the light quantity of the main beam CL1 to the light quantity of the positive and negative first-order sub beams CLa and CLb is substantially 18:1. The light quantity of the stray light CSL1 and CSL2 is equivalent to about 10% of the light quantity of the positive and negative first-order sub beams CLa and CLb. Thus, the light quantity of the stray light CSL1 and CSL2 is large relative to the light quantity the positive and negative first-order sub beams CLa and CLb. Therefore, when the stray light CSL1 and CSL2 enter a highly sensitive light-receiving region for the positive and negative first-order sub beams CLa and CLb, the quality of the resultant reproduction signal is degraded.

Figure 7A:
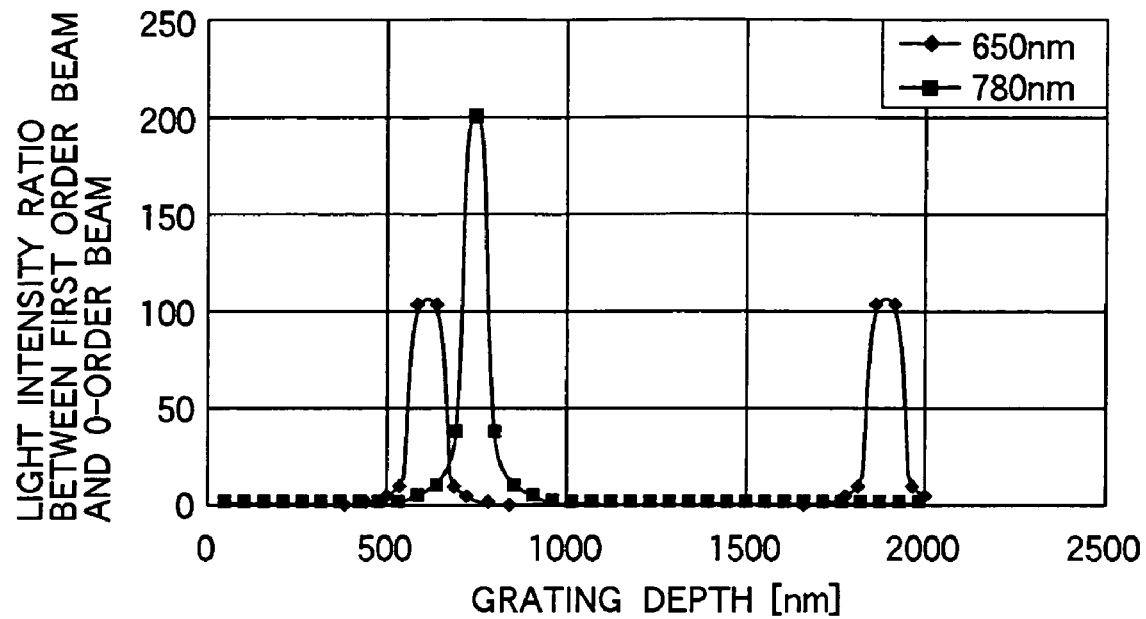
FIGS. 7A and 7B are graphs for explaining the diffraction grating 13 according to the first embodiment of the invention, showing a relationship between the grating depth of a diffraction grating having a rectangular section and the ratio of the light intensity of first-order beams to the light intensity of a 0-order beam.
Figure 7B:
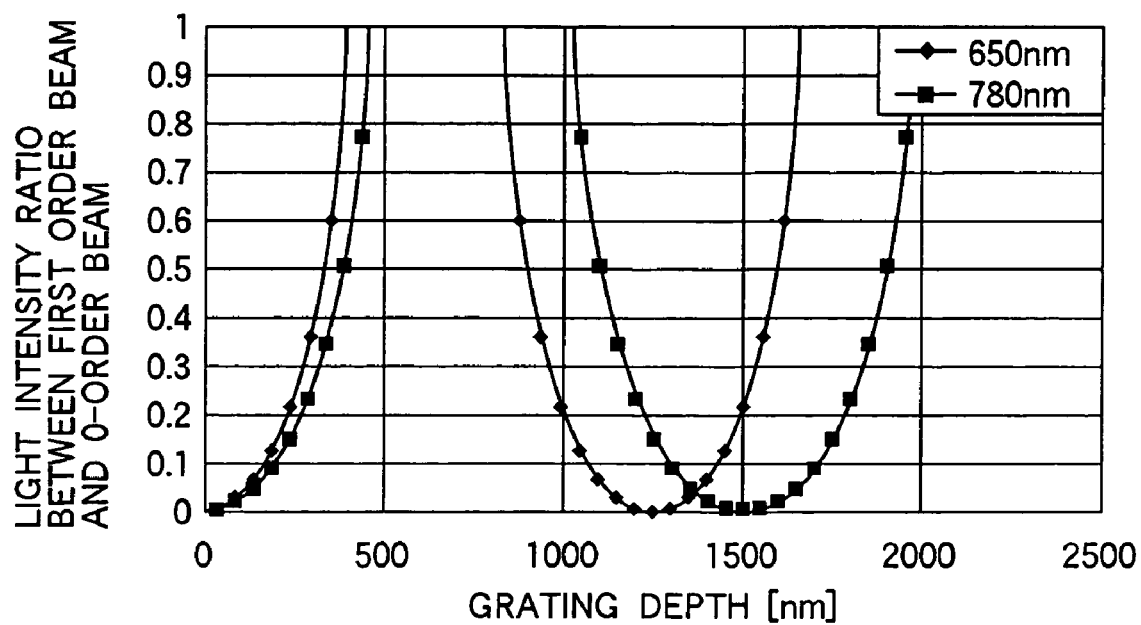

FIGS. 7A and 7B show a relationship between the grating depth of a diffraction grating having a rectangular section and the ratio of the light intensity of first-order beams to the light intensity of a 0-order beam. FIG. 7A shows the relationship between the grating depth and the ratio of the light intensity of first-order beams to the light intensity of a 0-order beam. FIG. 7B provides an enlarged view of the range in FIG. 7A in which the ratio of the light intensity of first-order beams to that of a 0-order beam is in the range from 0 to 1. In FIGS. 7A and 7B, the abscissa axis represents the grating depth (nm), and the ordinate axis represents the ratio of the light intensity of first-order beams to that of a 0-order beam. The curves connecting black rhombic symbols in the figures indicate characteristics of laser light having a wavelength of 650 nm (laser light for DVDs), and the curves connecting black square symbols in the figures indicate characteristics of laser light having a wavelength of 780 nm (laser light for CDs).

The characteristics shown in FIGS. 7A and 7B have been calculated on an assumption that a diffraction grating is used, which has a diffracting region having irregularities only on either light entrance surface or light exit surface thereof and which is formed of a glass material having a refractive index of 1.52. The ratio of the light intensity of first-order beams to that of a 0-order beam is calculated using a simulation based on the scalar diffraction theory on an assumption that the pitch length of the irregularities is 22 µm and that the ratio of the length of a convexity to the pitch length (the duty ratio of the irregularities) is 50%. The grating depths represented by the abscissa axes of FIGS. 7A and 7B are equivalent to the depths of concavities.

As shown in FIG. 7A, there is a grating depth at which the light intensity of a 0-order beam is very small compared to the light intensity of first-order beams and at which the ratio of the light intensity of the first-order beams to that of the 0-order beam is at the maximum. Such a depth varies depending on the wavelength of the laser light transmitted by the diffraction grating. In the range of grating depths from 0 to 2000 nm, the light intensity ratio is maximized at a grating depth of about 650 nm in the case of laser light having a wavelength of 650 nm, and the light intensity ratio is maximized at grating depths of about 780 nm and about 1850 nm in the case of laser light having a wavelength of 780 nm.

In the case of diffraction gratings having two different grating constants according to the related art, it is desirable that laser light for CDs is totally transmitted by a diffraction grating for DVDs or that the ratio of first-order beams to a 0-order beam is 0. When the grating depth of the diffraction grating is set at 1500 nm, as shown in FIG. 7B, first-order beams originating from laser light for CDs are 0. On the contrary, the ratio of the light intensity of first-order beams to that of a 0-order beam originating from laser light for DVDs is about 0.2 (about 20%). The duty ratio of the irregularities of the diffraction grating may be changed as will be described later when it is desired to change the light intensity ratio of the first-order beams to the 0-order beam with the grating depth fixed.

Figure 8A:
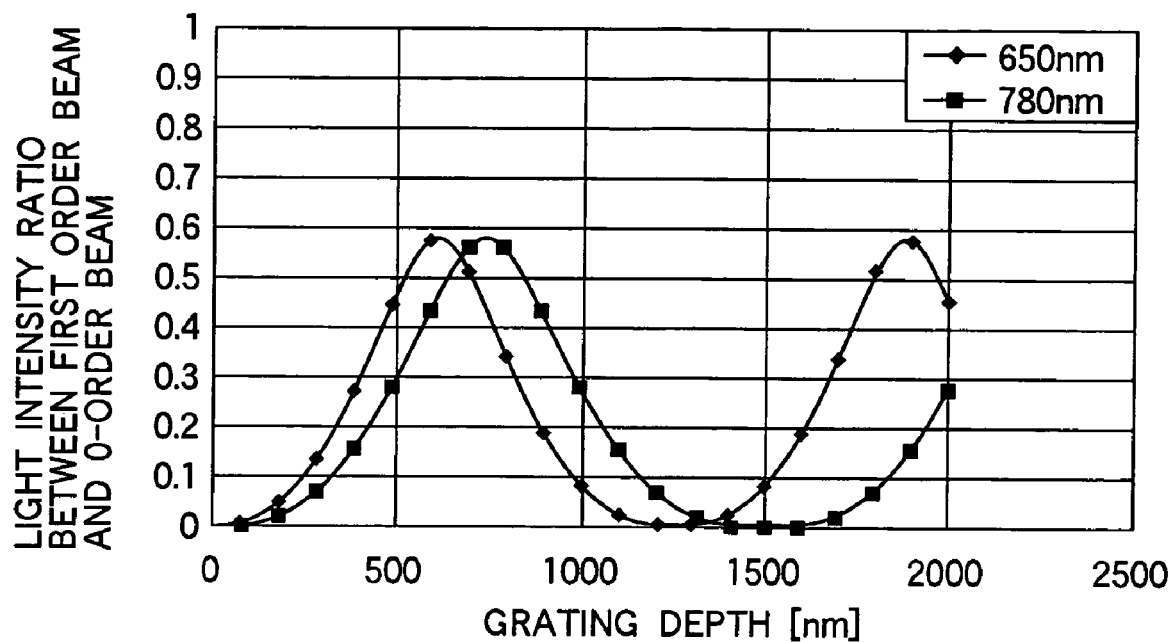
FIGS. 8A and 8B are graphs for explaining the diffraction grating 13 according to the first embodiment of the invention, showing a relationship between the grating depth of a diffraction grating having a rectangular section and the ratio of the light intensity of first-order beams to the light intensity of a 0-order beam.
Figure 8B:
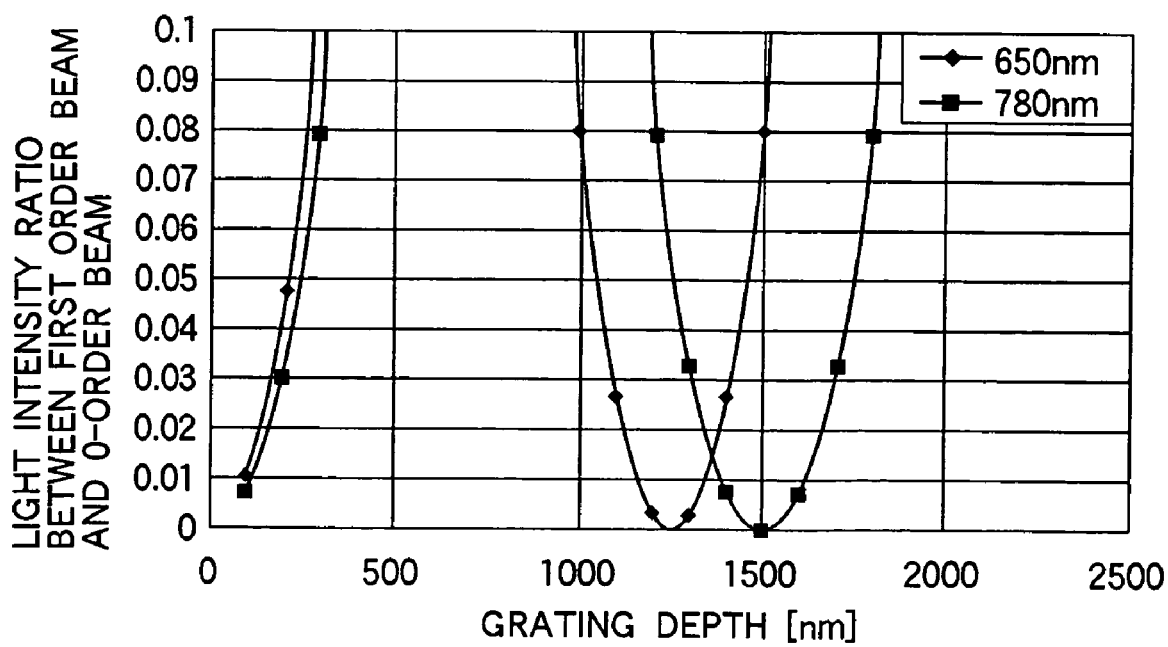

FIGS. 8A and 8B show a relationship between the grating depth of a diffraction grating and the ratio of the light intensity of first-order beams to the light intensity of a 0-order beam where the duty ratio of irregularities of the diffraction grating is 20%. FIG. 8A shows the relationship between the grating depth and the ratio of the light intensity of first-order beams to the light intensity of a 0-order beam. FIG. 8B provides an enlarged view of the range in FIG. 8A in which the ratio of the light intensity of first-order beams to that of a 0-order beam is in the range from 0 to 0.1. In FIGS. 8A and 8B, the abscissa axis represents the grating depth (nm), and the ordinate axis represents the ratio of the light intensity of first-order beams to that of a 0-order beam. The curves connecting black rhombic symbols in the figures indicate characteristics of laser light having a wavelength of 650 nm (laser light for DVDs), and the curves connecting black square symbols in the figures indicate characteristics of laser light having a wavelength of 780 nm (laser light for CDs). The characteristics shown in FIGS. 8A and 8B have been calculated under the same conditions as for the characteristics shown in FIGS. 7A and 7B except that the duty ratio of irregularities is different. While the characteristics shown in FIGS. 8A and 8B are results of calculations performed with the width of concavities set greater than the width of convexities (wide groove configuration), similar calculation results can be obtained also in a case wherein the width of convexities is set greater (the duty ratio of the irregularities is 80%).

The irregularities on the diffraction grating become flatter as the duty ratio of the irregularities becomes smaller to approach 0% or becomes greater to approach 100%. The diffracting effect of the diffraction grating is thus reduced, and the light intensity of a 0-order beam increases. Therefore, as shown in FIG. 8A, when the duty ratio of the irregularities is set at 20%, the light intensity ratio of first-order beams to a 0-order beam becomes smaller than that in the case of a duty ratio of 50%. For either of laser beams having wavelengths of 650 nm and 780 nm, the maximum value of the light intensity ratio of first-order beams to a 0-order beam is about 0.6 (about 60%).

As shown in FIG. 8B, when the grating depth is set at 1500 nm to nullify a first-order beam originating from laser light for CDs, the light intensity ratio of first-order beams to a 0-order beam originating from laser light for DVDs is about 0.08 (about 8%). When the duty ratio of the irregularities is varied from 50% to 80%, the light intensity ratio continuously changes without reaching an extreme value during the period. That is, the light intensity ratio of the first-order beam to the 0-order beam can be controlled for a monotonous reduction from 20% to 8% by varying the duty ratio from 50% to 80%. The light intensity ratio of the first-order beam to the 0-order beam can be similarly controlled for a monotonous reduction from 20% to 8% by varying the duty ratio of the irregularities from 50% to 20%.

When it is desired to set the ratio of the light quantity of a 0-order beam to the light quantity of first-order beams at 18:1 to prevent the heat of the first-order beams from erasing recording data which have already been written during a recording operation, the light intensity ratio of the first-order beams to the 0-order beam must be set at 5.56%. In order to achieve the light intensity ratio of 5.56% only by controlling the duty ratio of the irregularities, the duty ratio of the irregularities must be set greater than 80% or smaller than 20%. That is, it is necessary to design convexities having a width extremely greater or smaller than the width of concavities. Such a design is not suitable for practical use because it makes the processing of a diffraction grating difficult and results in great errors in the irregularities. For example, there is a possibility that concavities can be filled up when the width of convexities is extremely great. As a result, a diffracting region formed on a light entrance surface or light exit surface cannot be provided in a predetermined shape, and the diffracting capability of the diffraction grating is degraded. When the width of convexities is extremely small, the average thickness of the diffraction grating becomes small. As a result, the mechanical strength of the diffraction grating is reduced.

In order to set the light intensity ratio of first-order beams to a 0-order beam originating from laser light for DVDs at 5.56% with the duty ratio of irregularities set in the range from 20% to 80%, the grating depth must be designed slightly smaller than 1500 nm, i.e., at about 1450 nm as indicated by the curve connecting the black rhombuses in FIG. 8B. Thus, the diffraction grating cannot transmit the entire light quantity of a 0-order beam originating from laser light for CDs completely, and first-order beams will therefore be generated, although in a very small amount. For example, when the grating depth is set at about 1450 nm, the light intensity ratio of first-order beams to a 0-order beam is about 0.0025 (about 0.25%) as indicated by the curve connecting black squares in FIG. 8B, and first-order beams are therefore generated. Such first-order beams constitute stray light in diffraction gratings having two different grating constants. As thus described, it is difficult to eliminate stray light in diffraction gratings having two different grating constants completely for reasons including limitations on the processing of irregularities and the like.

It is desirable that the ratio of the light quantities of a main beam and positive and negative first-order sub beams is substantially the same for laser light for DVDs and laser light for CDs. In the present embodiment, as shown in FIG. 8B, the diffracting region 21 of the diffraction grating 13 is designed with attention paid to a range of relatively small grating depths in which the light intensity ratio of first order beams to a 0-order beam can be relatively constant for laser light for DVDs and laser light for CDs. As described above with reference to FIG. 2B, the diffraction grating 13 is formed of a glass material having a refractive index of 1.52. The irregularities 23 of the diffraction grating 13 are formed with a pitch length p of about 22 μm. The convexities 23a are formed with a width w of about 17.6 μm, and the concavities 23b are formed with a depth d of 220 nm. The irregularities 23 are formed to have a duty ratio of about 80%. When the first laser light 25 having a wavelength of 650 nm is transmitted by the diffraction grating 13, as shown in FIG. 8B, the light intensity ratio of positive and negative first-order sub beams 29a and 29b (first-order beams) to a main beam 27 (0-order beam) is about 5.56%. Thus, the diffraction grating 13 can generate the main beam 27 and the positive and negative first-order sub beams 29a and 29b which are in a light quantity ratio of 18:1 by diffracting and separating the first laser light 25.

When the second laser light 25' having a wavelength of 780 nm is transmitted by the diffraction grating 13, the light intensity ratio of positive and negative first-order sub beams 29a' and 29b' (first-order beams) to a main beam 27' (0-order beam) is about 3.5%. Thus, the diffraction grating 13 can generate the main beam 27' and the positive and negative first-order sub beams 29a' and 29b' which are in a light quantity ratio of 28:1 by diffracting and separating the second laser light 25'.

As described above with reference to FIGS. 2A and 2B, the concavities 23b of the irregularities 23 of the diffraction grating 13 are formed to have a depth d of 400 nm or less, and they are formed with a depth of 220 nm, for example. As shown in FIGS. 8A and 8B, it is desirable to set the depth d of the concavities 23b at 400 nm because the ratio of the light intensity of the positive and negative first-order sub beams 29a and 29b (positive and negative first-order beams) to that of the main beam 27 (0-order beam) of the first laser light 25 having a wavelength of 650 nm can be set at 25% or less (main beam 27: positive first-order sub beam 29a: negative first-order sub beam 29b=4:1:1) in this case. Further, it is more desirable to set the depth d of the concavities 23b at 250 nm or less just as in the case of the diffraction grating 13 of the present embodiment. The reason is that the ratio of the light intensity of the positive and negative first-order sub beams 29a and 29b to that of the main beam 27 of the laser light having a wavelength of 650 nm can be set at 10% or less (main beam 27: positive first-order sub beam 29a: negative first-order sub beam 29b=10:1:1).

It is desirable that there is only a small difference between the laser light having a wavelength of 650 nm and the laser light having a wavelength of 780 nm in terms of the ratio of the light intensity of positive and negative first-order sub beams (positive and negative first-order beams) to that of a main beam (0-order beam). The difference between the beams of laser light in terms of the light intensity ratio becomes small at a grating depth (the depth d of the concavities 23b) of 400 nm or less. The difference between the beams of laser light in terms of the light intensity ratio becomes small also in the vicinity of a grating depth of 1400 nm. However, the ratio of the light intensity of the positive and negative first-order sub beams to that of the main beam changes significantly in response to a slight change in the grating depth in the vicinity of the grating depth of 1400 nm. Further, it is difficult to put a diffraction grating 13 with a grating depth of 1400 nm in practical use because the excessively large depth makes processing difficult.

Figure 9A:
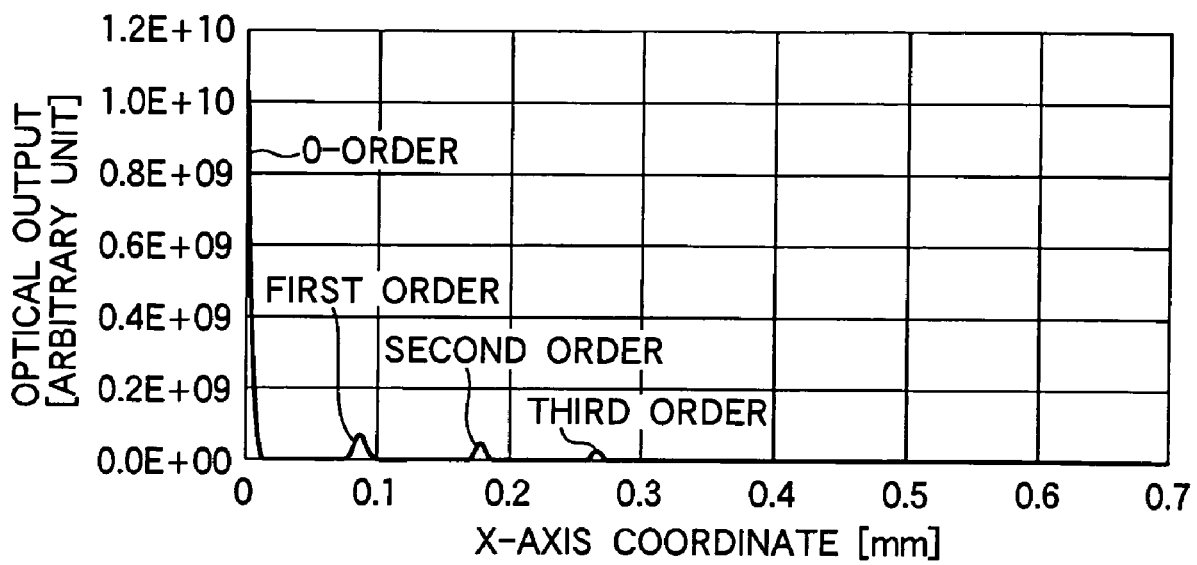
FIGS. 9A and 9B are graphs showing results of measurement of separating positions and light intensity of beams diffracted by the diffraction grating 13 according to the first embodiment of the invention.
Figure 9B:
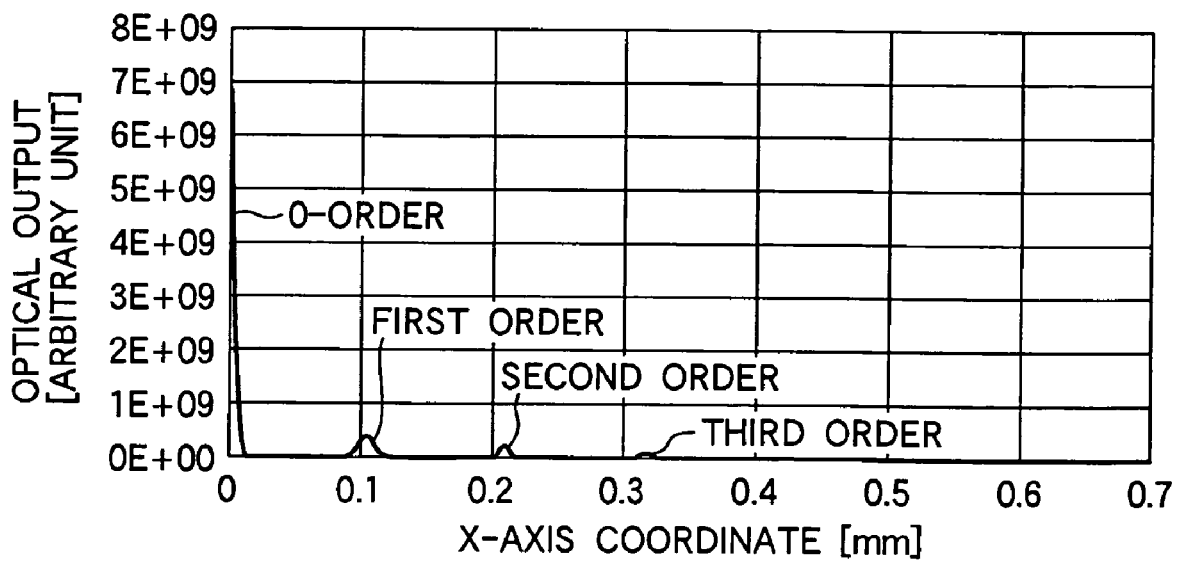

FIGS. 9A and 9B show results of measurement of separating positions and light intensities of beams diffracted by the diffraction grating 13. FIG. 9A shows results of measurement on laser light for DVDs (having a wavelength of 650 nm). FIG. 9B shows results of measurement on laser light for CDs (having a wavelength of 780 nm). The abscissa axes in FIGS. 9A and 9B represent x-axis coordinates (mm) on a screen 39 to be described later, and the ordinate axes represent optical output (in arbitrary unit) of diffracted beams.

Figure 10:
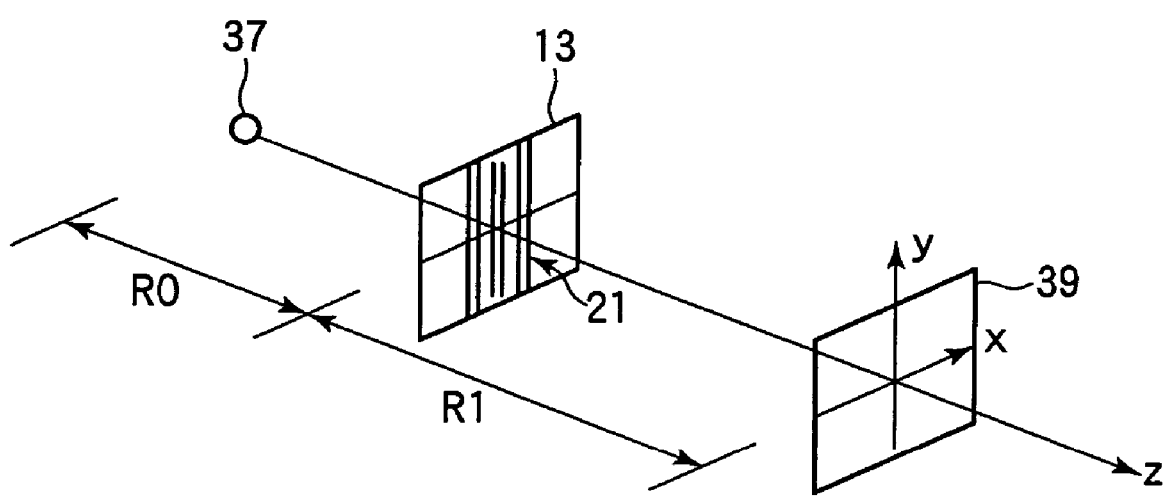
FIG. 10 schematically shows a measuring system used for the measurement of separating positions and light intensities of beams diffracted by the diffraction grating 13 according to the first embodiment of the invention.

FIG. 10 schematically shows a measuring system used for the measurement of separating positions and light intensities of diffracted beams shown in FIGS. 9A and 9B. As shown in FIG. 10, the diffraction grating 13 and the screen 39 are disposed in the order listed on a z-axis along which laser light emitted by a light source 37 travels such that the light entrance surface is substantially orthogonal to the z-axis. The diffraction grating 13 is disposed with its optical axis aligned with the z-axis. The screen 39 to be irradiated with beams diffracted by the diffraction grating 13 is disposed with the origin of an xy orthogonal coordinate system in the plane irradiated by the diffracted beams aligned with the z-axis. The wavelength of the laser light emitted by the light source 37 is 650 nm or 780 nm. A distance R0 between the light source 37 and the diffraction grating 13 and a distance R1 between the diffraction grating 13 and the screen 39 are both set at 3 mm.

As shown in FIG. 9A, the light intensity of diffracted beams generated by mutual interference and enhancement between beams of laser light (having a wavelength of 650 nm) diffracted by the diffraction grating 13 is maximized at the origin of the xy orthogonal coordinate system and is gradually reduced as they move away from the origin in the positive direction along the x-axis. In FIG. 9A, the orders of diffraction of peaks of the light intensity of the diffracted beams are 0-order, positive first-order, positive second-order, and positive third-order from the extreme left in the figure. Negative first-order, negative second-order, and negative third-order diffracted beams are generated in the negative direction along the x-axis in a symmetrical relationship with the above-mentioned diffracted beams about y-axis, although omitted in FIG. 9A. As shown in FIG. 9A, the light intensity of the 0-order beam is about $1.2 \times 10^{10}$, whereas the light intensity of the first-order beam is about $0.7 \times 10^9$. The ratio of the light quantities of the 0-order beam and the first-order beam is substantially 18:1.

As shown in FIG. 9B, the light intensity of diffracted beams generated by mutual interference and enhancement between beams of laser light (having a wavelength of 780 nm) diffracted by the diffraction grating 13 is maximized at the origin of the xy orthogonal coordinate system and is gradually reduced as they move away from the origin in the positive direction along the x-axis. In FIG. 9B, the orders of diffraction of peaks of the light intensity of the diffracted beams are 0-order, positive first-order, positive second-order, and positive third-order from the extreme left in the figure. Negative first-order, negative second-order, and negative third-order diffracted beams are generated in the negative direction along the x-axis in a symmetrical relationship with the above-mentioned diffracted beams about y-axis, although omitted in FIG. 9B. As shown in FIG. 9B, the light intensity of the 0-order beam is about $8.0 \times 10^9$ whereas the light intensity of the first-order beam is about $0.3 \times 10^9$. The ratio of the quantities of the 0-order beam and the first-order beam is substantially 28:1.

As thus described, the diffraction grating 13 of the present embodiment has the diffracting region 21 in which the concavities 23b of the irregularities 23 are formed with a depth d of 220 nm. The depth d of the concavities 23b of the diffraction grating 13 is smaller than that of concavities of a diffraction grating in the related art. Therefore, when the diffracting region 21 is formed, for example, by etching the light entrance surface or light exit surface, the etching can be performed in a short time to reduce the time required for steps of manufacturing the diffraction grating 13.

When the diffraction grating 13 is formed using injection molding, the metal mold can be relatively easily processed and can be provided with a long life. The manufacturing cost of the diffraction grating 13 can be thus reduced.

Further, the irregularities 23 of the diffraction grating 13 can be formed with a duty ratio from 20% to 80%, inclusive. The diffracting region 21 can be relatively easily formed with irregularities 23 which uniformly and continuously repeat. Thus, the diffraction grating 13 will have a high effect of diffraction. Since the diffraction grating 13 has the diffracting region 21 only on either light entrance surface or light exit surface thereof, there will be no stray light originating from unused laser light. As a result, the optical head 10 can detect a reproduction signal or a tracking servo signal in a good condition.

A description will now be made with reference to FIG. 1 and FIGS. 3A to 5 on operations of the optical head 10 and a method of detecting a tracking servo signal. Although the following description will address the first laser light 25 by way of example, the optical head 10 operates similarly with respect to the second laser light 25'. As shown in FIG. 1, first laser light 25, which is linearly polarized light emitted by the two-wavelength semiconductor laser 11, enters the diffraction grating 13 after being converted into circularly polarized light by the phase difference plate 12, and it is diffracted and separated into a main beam 27 and positive and negative first-order sub beams (not shown). The main beam 27 and the positive and negative first-order sub beams enter the beam splitter 14. About one-half of the light quantity of each of the main beam 27 and the positive and negative first-order sub beams entered beam splitter 14 is reflected by the beam splitter 14. The traveling direction of the beam is thus deflected at 90°, and the beam exits the splitter toward the collimator lens 15. The main beam 27 and the positive and negative first-order sub beams incident on the collimator lens 15 are divergent bundles of rays.

The collimator lens 15 converts the main beam 27 and the positive and negative first-order sub beams from the beam splitter 14 into parallel bundles of rays. The traveling direction of the main beam 27 and the positive and negative first-order sub beams which have exited the collimator lens 15 is changed by the rising mirror (not shown in the figure) into a direction substantially orthogonal to the information recording surface of the first or the second optical recording medium 1a or 1b. The beams are then incident on the objective lens 16 and are converted by the objective lens 16 into convergent pencils of rays which are then projected on the information recording surface of the first or the second optical recording medium 1a or 1b as spots of beams.

At this time, as shown in FIGS. 3A, 3B and 4, the beams 27 and the positive and negative first-order sub beams 29a and 29b are at spot intervals SP1 of about 0.39 μm in the radial direction of the first or the second optical recording medium 1a or 1b. The spot intervals SP1 are adjusted by rotating the diffracting region 21 of the diffraction grating 13 about the optical axis of the diffraction grating 13.

When the second laser light 25' is transmitted by the diffraction grating 13 adjusted as thus described, the main beam 27' and the positive and negative first-order sub beams 29a' and 29b' diffracted and separated by the diffraction grating 13 are at spot intervals SP2 of about 0.468 μm in the radial direction of the third optical recording medium 1c (see FIGS. 3A to 4).

Reflected light from the first or the second optical recording medium 1a or 1b reaches the beam splitter 14 after passing through a objective lens 16, a rising mirror (not shown) and the collimator lens 15 sequentially, and about one-half of the light quantity of the light is transmitted by the beam splitter 14. Each of the beams transmitted by the beam splitter 14 is converged on the first light-receiving region 18a formed on the light-receiving element 18 through the sensor lens 17.

As shown in FIG. 5, the main beam 27 impinges on the main beam receiving area 18a1. The positive and negative first-order sub beams 29a and 29b impinge on the sub beam receiving areas 18a2 and 18a3, respectively. When the main beam 27 and the positive and negative first-order sub beams 29a and 29b accurately follow up a track on the first or the second optical recording medium 1a or 1b, the main beam 27 is received by the light-receiving portions A, B, C, and D at substantially the same light intensity; the positive first-order sub beam 29a is received by the light-receiving portions E1, F1, G1, and H1 at substantially the same light intensity; and the negative first-order sub beam 29b is received by the light-receiving portions E2, F2, G2, and H2 at substantially the same light intensity.

Let us assume that the main beam 27 and the sub beams 29a and 29b are, on the contrary, offset toward either side of a predetermined track of the first or second optical recording medium 1a or 1b. Then, for example, the light intensity of the main beam 27 is higher at the light-receiving portions A and B and lower at the light-receiving portions C and D. The positive and negative first-order sub beams 29a and 29b have respective lower light intensities at the light-receiving portions E1, F1, E2, and F2 and have respective higher light intensities at the light-receiving portions G1, H1, G2, and H2. Let us assume that the main beam 27 and the sub beams 29a and 29b are offset toward the other side of the predetermined track of the first or second optical recording medium 1a or 1b. Then, for example, the light intensity of the main beam 27 is lower at the light-receiving portions A and B and higher at the light-receiving portions C and D. The positive and negative first-order sub beams 29a and 29b have respective higher light intensities at the light-receiving portions E1, F1, E2, and F2 and have respective lower light intensities at the light-receiving portions G1, H1, G2, and H2.

Therefore, a tracking servo signal TS is obtained as follows.

$$TS = \{(VA+VB)-(VC+VD)\} - k1 \times \{(VE1+VE2+VF1+VF2)-(VG1+VG2+VH1+VH2)\}$$

where VA, VB, VC, VD, VE1, VF1, VG1, VH1, VE2, VF2, VG2, and VH2 represent detection voltages obtained by photoelectric conversion at the light-receiving portions A, B, C, D, E1, F1, G1, H1, E2, F2, G2, and H2, respectively, and where k1 represents a predetermined coefficient. The coefficient k1 is set such that DC offset components generated by a shift of the objective lens 16 in the radial direction of the first or the second optical recording medium 1a or 1b will be eliminated from the signal TS. As thus described, a tracking servo signal on the first or the second optical recording medium 1a or 1b (DVD type optical recording medium) is obtained using the differential push-pull method. A reproduction signal RF is given by:

$$RF=VA+VB+VC+VD+VE1+VF1+VG1+VH1+VE2+VF2+VG2+VH2$$

Each of the main beam 27' and the positive and negative first-order sub beams 29a' and 29b' originating from the second laser light 25' is converged on the second light-receiving region 18b formed on the light-receiving element 18. As shown in FIG. 5, the main beam 27' impinges on the main beam receiving area 18b1. The positive and negative first-order sub beams 29a' and 29b' impinge on the sub-beam receiving areas 18b2 and 18b3, respectively. When the main beam 27' and the positive and negative first-order sub beams 29a' and 29b' accurately follow up a track on the third optical recording medium 1c, the main beam 27' is received by the light-receiving portions A, B, C, and D at substantially the same light intensity. As shown in FIG. 3C, the centers of the positive and negative first-order sub beam 29a' and 29b' are substantially aligned with edges of the track on the third optical recording medium 1c.

Thus, the positive and negative first-order sub beams 29a' and 29b' are received, for example, by the light-receiving portion I1 of the sub beam receiving area 18b2 and the light-receiving portion J2 of the sub beam receiving area 18b3, respectively, at substantially the same light intensity. The sub beams are received by the light-receiving portion J1 of the sub beam receiving area 18b2 and the light-receiving portion I2 of the sub beam receiving area 18b3, respectively, at substantially the same light intensity (the light intensity at the light-receiving portions I2 and J1 is higher than the light intensity at the light-receiving portions I1 and J2). Therefore, when the main beam 27' and the positive and negative first-order sub beams 29a' and 29b' accurately follow up a track on the third optical recording medium 1c, the intensity of the light received by the sub beam receiving area 18b2 is substantially equal to the intensity of the light received by the sub beam receiving area 18b3.

Let us assume that the main beam 27' and the positive and negative first-order sub beams 29a' and 29b' are, on the contrary, offset toward either side of a predetermined track of the third optical recording medium 1c. Then, for example, the light intensity of the main beam 27' is higher at the light-receiving portions A and B and lower at the light-receiving portions C and D. In this case, in comparison to the light intensity of the positive and negative first-order sub beams 29a' and 29b' when they accurately follow up a track of the third optical recording medium 1c, the light intensity of the positive first-order sub beam 29a' at the light-receiving portions I1 and J1 is lower, and the light intensity of the negative first-order sub beam 29b' at the light-receiving portions I2 and J2 is higher. Let us assume that the main beam 27' and the positive and negative first-order sub beams 29a' and 29b' are, on the contrary, offset toward the other side of the predetermined track of the third optical recording medium 1c. Then, for example, the light intensity of the main beam 27' is lower at the light-receiving portions A and B and higher at the light-receiving portions C and D. In this case, in comparison to the light intensity of the positive and negative first-order sub beams 29a' and 29b' when they accurately follow up a track of the third optical recording medium 1c, the light intensity of the positive first-order sub beam 29a' at the light-receiving portions I1 and J1 is higher, and the light intensity of the negative first-order sub beam 29b' at the light-receiving portions I2 and J2 is lower.

Therefore, a tracking servo signal TS is obtained as follows.

$$TS=(VI1+VJ1)-(VI2+VJ2)$$

where VI1, VJ1, VI2, and VJ2 represent detection voltages obtained by photoelectric conversion at the light-receiving portions I1, J1, I2, and J2, respectively. As thus described, a tracking servo signal on the third optical recording medium 1c (CD type optical recording medium) is obtained using the three beam method. A reproduction signal RF is given by:

$$RF=VA+VB+VC+VD+VI1+VJ1+VI2+VJ2$$

As described above, the diffracting region 21 of the diffraction grating 13 in the present embodiment is formed such that the spot intervals SP2 between the main beam 27' and the positive and negative first-order sub beams 29a' and 29b' are approximately equal to a quarter of the physical track pitch P3 of the third optical recording medium 1c when the spot intervals SP1 between the main beam 27 and the positive and negative first-order sub beams 29a and 29b are adjusted so as to approximately equal to one-half of the physical track pitch P1 of the first optical recording medium 1a. Thus, the optical head 10 can detect a tracking servo signal from the first and the second optical recording media 1a and 1b (DVD type optical recording media) using the differential push-pull method. The optical head 10 can detect a tracking servo signal from the third optical recording medium 1c (CD type optical recording medium) using the three beam method. Further, since no stray light is generated at the diffraction grating 13, the optical head 10 can detect a reproduction signal and a tracking servo signal of high quality.

Figure 11:
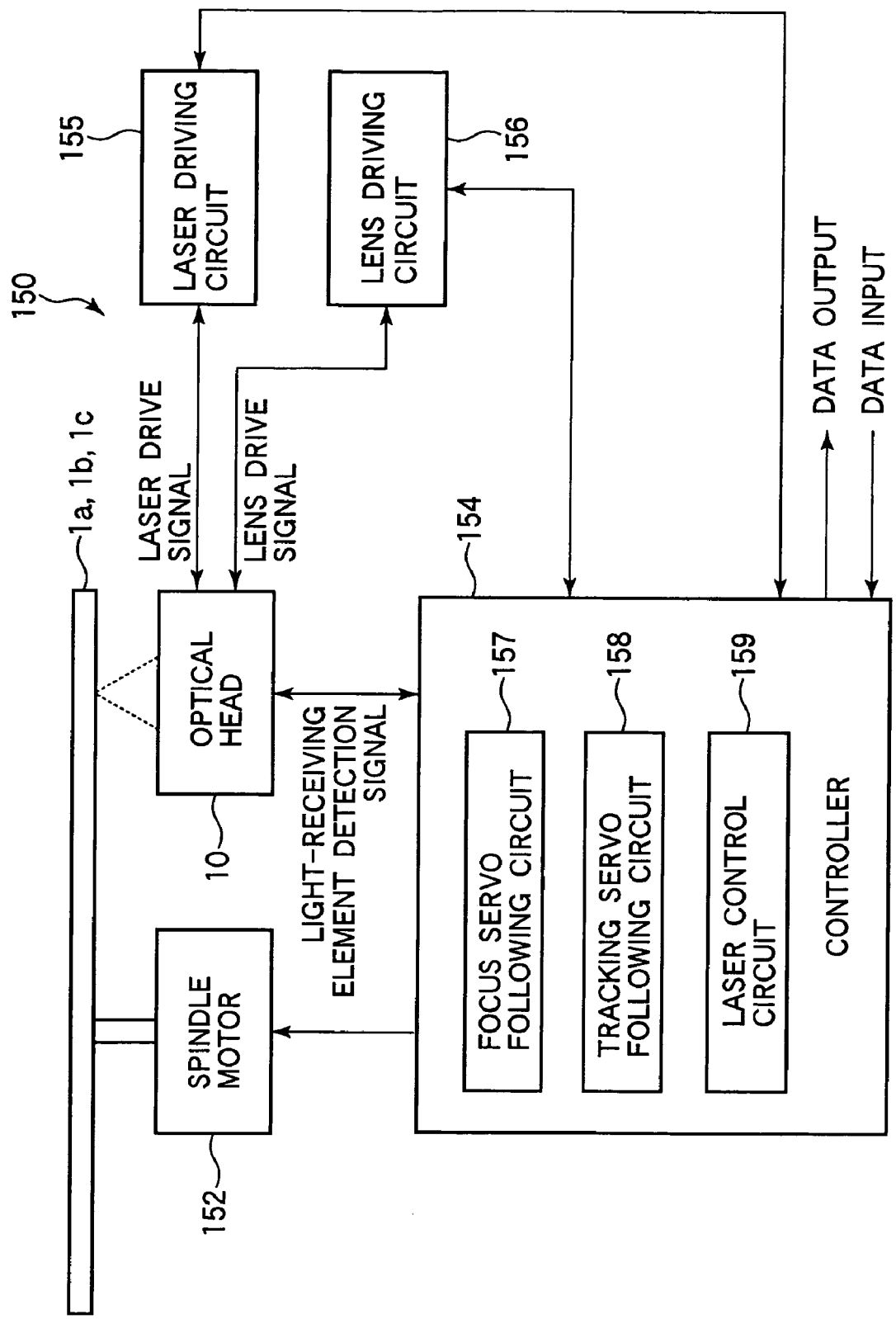
FIG. 11 shows a schematic configuration of an optical recording/reproducing apparatus 150 according to the first embodiment of the invention.

An optical recording/reproducing apparatus according to the present embodiment will now be described. FIG. 11 shows a schematic configuration of an optical recording/reproducing apparatus 150 carrying an optical head 10 according to the present embodiment. As shown in FIG. 11, the optical recording/reproducing apparatus 150 includes a spindle motor 152 for rotating the first to the third optical recording media 1a, 1b, and 1c, the optical head 10 for irradiating the first to the third optical recording media 1a, 1b, and 1c with laser light and receiving reflected light from the same, a controller 154 for controlling operations of the spindle motor 152 and the optical head 10, a laser driving circuit 155 for supplying a laser driving signal to the optical head 10, and a lens driving circuit 156 for supplying a lens driving signal to the optical head 10.

The controller 154 includes a focus servo following circuit 157, a tracking servo following circuit 158, and a laser control circuit 159. When the focus servo following circuit 157 operates, focus servo is activated on an information recording surface of the first, the second, or the third optical recording medium 1a, 1b, or 1c which is rotating. When the tracking servo following circuit 158 operates, a spot of a laser beam automatically follows up any eccentric signal track of the first, the second, or the third optical recording medium 1a, 1b, or 1c. The focus servo following circuit 157 and the tracking servo following circuit 158 are provided with an automatic gain control function for automatically adjusting a focus gain and an automatic gain control function for automatically adjusting a tracking gain, respectively. The laser control circuit 159 is a circuit for generating the laser driving signal supplied by the laser driving circuit 155, and the circuit generates an appropriate laser driving signal based on recording condition setting information recorded on the first, the second, or the third optical recording medium 1a, 1b, or 1c.

It is not essential that the focus servo circuit 157, the tracking servo following circuit 158, and the laser control circuit 159 are circuits incorporated in the controller 154, and they may be components separate from the controller 154. Further, it is not essential that the circuits are physical circuits, and they may be programs executed in the controller 154.

Second Embodiment

A description will now be made with reference to FIGS. 12 and 13 on a diffraction grating, a light-receiving element, and an optical head and an optical recording/reproducing apparatus utilizing them according to a second embodiment of the invention. The diffraction grating 13 of the above-described embodiment has the diffracting region 21 which has a linear shape when viewed in a direction normal to the light entrance surface thereof. On the contrary, a diffraction grating 40 of the present embodiment is characterized in that it has a diffracting region 41 which has a wavy shape when viewed in a direction normal to a light entrance surface thereof. The configurations of the optical head and the optical recording/reproducing apparatus of the present embodiment will not be described because they are the same as those in the above-described embodiment. The method of detecting a tracking servo signal employed for the optical head of the present embodiment will not be described because it is the same as that in the above-described embodiment.

Figure 12:
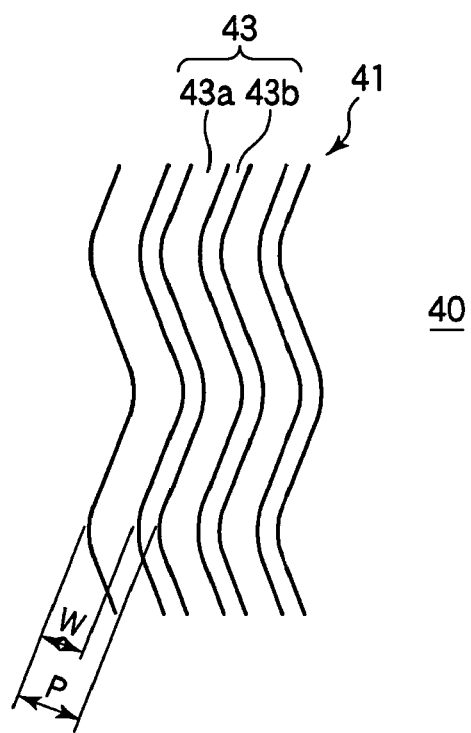
FIG. 12 shows a schematic configuration of a diffraction grating 13 according to a second embodiment of the invention.

FIG. 12 is a view of a part of the diffracting region 41 of the diffraction grating 40 in the present embodiment taken from the side of a light exit surface thereof. As shown in FIG. 12, the diffracting region 41 has repetitive and continuous irregularities 43 which are formed in a wavy shape. A concavity 43b of irregularities 43 is formed to have a depth of 400 nm or less and is formed, for example, with a depth of 220 nm. For example, the irregularities 43 are formed to have a rectangular section. The irregularities 43 are formed such that the ratio of the width (represented by w) of a convexity 43a to one pitch length p of the irregularities 43 (the duty ratio of the irregularities 43) is kept in the range from 0.2 to 0.8. For example, the irregularities 43 are formed such that the pitch length p is 22 μm and a convexity 43a has a width w of 17.6 μm. The duty ratio of the irregularities 43 is therefore 0.8.

It is desirable that the amplitude and period of the wavy shape of the diffracting region 41 is substantially constant throughout the light entrance surface or light exit surface of the diffraction grating 40. This is desirable to allow laser light to be split in a consistent way regardless of the part of the diffraction grating 40 where the laser light impinges even if there is a lens shift.

Figure 13:
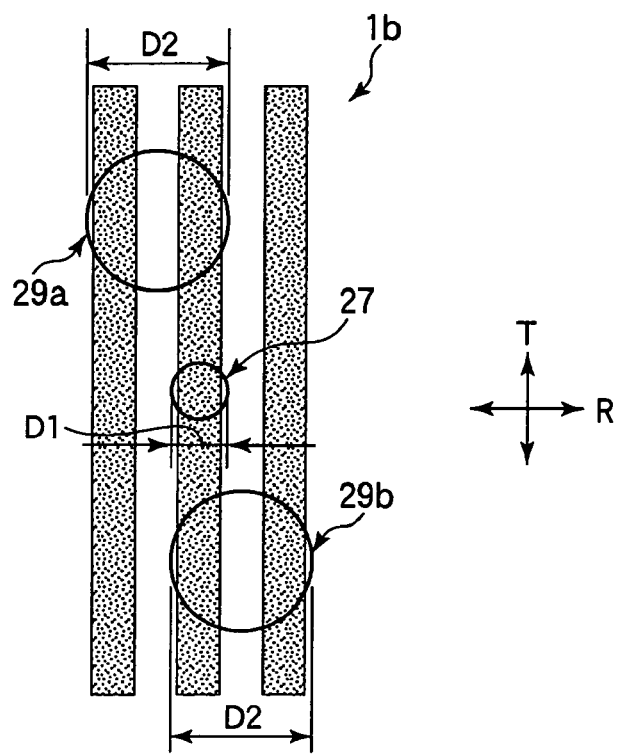
FIG. 13 schematically shows a main beam 27 and positive and negative first-order sub beams 29a and 29b converged on an information recording surface of a second optical recording medium 1b by an optical head according to the second embodiment of the invention.

FIG. 13 schematically shows states of a main beam 27 and positive and negative first-order sub beams 29a and 29b converged on the information recording surface of the second optical recording medium 1b. The arrows in the horizontal direction in FIG. 13 represent the radial direction R of the second optical recording medium 1b, and the arrows in the vertical direction represent a direction T tangential to tracks of the second optical recording medium 1b.

As shown in FIG. 13, since the diffracting region 41 of the diffraction grating 40 is formed in a wavy shape, diameters D2 of the spots of the positive and negative first-order sub beams 29a and 29b converged on the information recording surface of the second optical recording medium 1b in the radial direction R can be greater than a diameter D1 of the spot of the main beam 27 in the same direction. Thus, the diffraction grating 40 can impart aberration to the positive and negative first-order sub beams 29a and 29b to make the spot diameter D2 relatively great. It is not essential that the spots of the positive and negative first-order sub beams 29a and 29b are circular, and they may be elliptic as long as the spot diameter D2 in the radial direction R is equal to or greater than 2.5 times of the spot diameter D1 of the main beam 27 in the same direction.

When the radial length D2 of the positive and negative first-order sub beams 29a and 29b is increased, since a cut-off frequency for an optical transfer coefficient of the positive and negative first-order sub beams 29a and 29b is shifted to the lower frequency side, track cross signal components having a high spatial frequency (the inverse of the track pitch) will be eliminated. As a result, positive and negative first-order sub beams 29a and 29b reflected by the second optical recording medium 1b are received by sub beam receiving elements 18a2 and 18a3, and electrical signals output from the sub beam receiving elements 18a2 and 18a3 respectively can be used to detect a focus servo signal while reducing track cross signals included therein. The same effect can be achieved on the first and the third optical recording media 1a and 1c.

As described above, the optical head of the present embodiment can detect a focus servo signal while reducing track cross signals included therein.

What is claimed is:

1. A light-receiving element for receiving a 0-order beam and positive and negative first-order beams which are generated by diffracting and separating each of first light having a first wavelength and second light having a second wavelength emitted by a light source and which is converged on a first optical recording medium, a second optical recording medium, and a third optical recording medium and which is reflected from the first optical recording medium, the second optical recording medium, and the third optical recording medium, the element comprising:

a first light-receiving region disposed based on the first wavelength and having a 0-order beam receiving area for receiving the 0-order beam generated as a result of diffraction of the first light, reflected from the first or the second optical recording medium, and first-order beam receiving areas for receiving the positive and negative first-order beams generated as a result of diffraction of the first light, respectively; and a second light-receiving region disposed based on the second wavelength and having a 0-order beam receiving area for receiving the 0-order beam generated as a result of diffraction of the second light, reflected from the third optical recording medium, and first-order beam receiving areas for receiving the positive and negative first-order beams generated as a result of diffraction of the second light, respectively, wherein:

the first and the second light-receiving regions are disposed side by side and kept away from each other at an interval LB in a direction tangential to a track of the first, the second, or the third optical recording medium, based on an interval LA between first and second light-emitting portions, and the positive first order beam receiving area of the first light-receiving region and the positive first-order beam receiving area of the second light-receiving region are kept away from each other at the interval LB and the negative first order beam receiving area of the first light-receiving region and the negative first-order beam receiving area of the second light-receiving region are kept away from each other at the interval LB.

2. A light-receiving element according to claim 1, wherein the ratio of a distance L1 between the centers of the 0-order beam receiving area and each of the first-order beam receiving areas in the first light-receiving region to a distance L2 between the centers of the 0-order beam receiving area and each of the first-order beam receiving areas in the second light-receiving region is substantially equal to the ratio of the first wavelength to the second wavelength.

3. A light-receiving element according to claim 1, wherein the 0-order beam receiving area and the first-order beam receiving areas of the first light-receiving region have a division line extending in a direction tangential to a track of the second optical recording medium.

4. A light-receiving element according to claim 1, wherein the 0-order beam receiving area and the first-order beam receiving areas, of both the first and second light receiving regions, are disposed side by side in the radial direction of the first, second, or third optical recording medium.

5. A light-receiving element according to claim 1, wherein the first and the second light-receiving regions are disposed side by side in the direction tangential to a track of the first, second, or third optical recording medium.

6. An optical head comprising:
a light source emitting first light having a first wavelength and second light having a second wavelength;
a diffraction grating having a diffracting region formed only on either a light entrance surface or a light exit surface for diffracting and separating the first and the second light to generate a 0-order beam and positive and negative first-order beams;
a plurality of continuous and repetitive irregularities formed onto the diffracting region, each irregularity having a rectangular section having a convex section and a concave section, such that the convex section and concave section combine to form a pitch length wherein a ratio of a width of the concave section to the pitch is in the range of 0.2 to 0.8;
a light-receiving element including a first light-receiving region disposed based on the first wavelength and having a 0-order beam receiving area for receiving the 0-order beam generated as a result of diffraction of the first light and first-order beam receiving areas for receiving the positive and negative first-order beams generated as a result of diffraction of the first light, respectively, and including a second light-receiving region disposed based on the second wavelength and having a 0-order beam receiving area for receiving the 0-order beam generated as a result of diffraction of the second light and first-order beam receiving areas for receiving the positive and negative first-order beams generated as a result of diffraction of the second light, respectively,
the first and the second light-receiving regions are disposed side by side and kept away from each other at an interval LB in a direction tangential to a track of the first, the second, or the third optical recording medium, based on an interval LA between first and second light-emitting portions, and
the positive first-order beam receiving area of the first light-receiving region and the positive first-order beam receiving area of the second light-receiving region are kept away from each other at the interval LB and the negative first-order beam receiving area of the first light-receiving region and the negative first-order beam receiving area of the second light-receiving region are kept away from each other at the interval LB.

7. An optical head according to claim 6, wherein the diffraction grating is a diffraction grating comprising:
a light entrance surface;
a light exit surface; and
a diffracting region which is disposed in both optical paths of a first light having a first wavelength and a second light having a second wavelength and which is formed only on either one of the light entrance surface or the light exit surface for diffracting each of the first and the second lights and separating each light into a 0-order beam and positive and negative first-order beams, wherein the diffracting region includes repetitive and continuous irregularities, each irregularity having a concavity with a depth of 400 nm or less.

8. An optical head according to claim 6, wherein the light-receiving element is a light-receiving element for receiving a 0-order beam and positive and negative first-order beams which are generated by diffracting and separating each of first light having a first wavelength and second light having a second wavelength emitted by a light source and which is converged on an optical recording medium and which is reflected on the optical recording medium, the element comprising:
a first light-receiving region disposed based on the first wavelength and having a 0-order beam receiving area for receiving the 0-order beam generated as a result of diffraction of the first light and first-order beam receiving areas for receiving the positive and negative first-order beams generated as a result of diffraction of the first light, respectively; and
a second light-receiving region disposed based on the second wavelength and having a 0-order beam receiving area for receiving the 0-order beam generated as a result of diffraction of the second light and first-order beam receiving areas for receiving the positive and negative first-order beams generated as a result of diffraction of the second light, respectively, wherein the ratio of a distance L1 between the centers of the 0-order beam receiving area and each of the first-order beam receiving areas in the first light-receiving region to a distance L2 between the centers of the 0-order beam receiving area and each of the first-order beam receiving areas in the second light-receiving region is substantially equal to the ratio of the first wavelength to the second wavelength.

9. An optical head according to claim 6, wherein the light source includes a first light-emitting portion emitting the first light which is suitable for recording and reproduction on and from a DVD type optical recording medium and a second light-emitting portion emitting the second light which is suitable for recording and reproduction on and from a CD type optical recording medium.

10. An optical head according to claim 9, wherein:
spots of the positive and negative first-order beams generated as a result of diffraction of the light having the first wavelength are disposed on a DVD type optical recording medium (first optical recording medium) having a physical track pitch P1 or a DVD type optical recording medium (second optical recording medium) having a physical track pitch P2 (P2>P1) in positions which are symmetric about a spot of the 0-order beam generated as a result of diffraction of the light having the first wavelength and which are at a distance of about $P1 \times (n+\frac{1}{2})$ from the spot (where n is 0 or a greater integer) in the radial direction of the first or the second optical recording medium; and spots of the positive and negative first-order beams generated as a result of diffraction of the light having the second wavelength are disposed on a CD type optical recording medium (third optical recording medium) having a physical track pitch P3 (P3>P2) in positions which are symmetric about a spot of the 0-order beam generated as a result of diffraction of the light having the second wavelength and which are at a distance of about P3 ×(n+¼) from the spot (where n is 0 or a greater integer) in the radial direction of the third optical recording medium.

11. An optical head according to claim 9, wherein a tracking servo signal on the DVD type optical recording medium is detected using the differential push-pull method and wherein a tracking servo signal on the CD type optical recording medium is detected using the three beam method.

12. An optical recording/reproducing apparatus comprising an optical head according to claim 6.

* * * * *